United States Patent
Kern

(10) Patent No.: US 8,872,795 B2
(45) Date of Patent: Oct. 28, 2014

(54) RESISTIVE TOUCH PANEL WITH IMPROVED TERMINATION

(75) Inventor: Lynn R. Kern, Tucson, AZ (US)

(73) Assignee: SMSC Holdings S.a.r.l., Luxembourg (LU)

( * ) Notice: Subject to any disclaimer, the term of this patent is extended or adjusted under 35 U.S.C. 154(b) by 203 days.

(21) Appl. No.: 13/605,799

(22) Filed: Sep. 6, 2012

(65) Prior Publication Data

US 2013/0057510 A1    Mar. 7, 2013

Related U.S. Application Data

(60) Provisional application No. 61/531,534, filed on Sep. 6, 2011, provisional application No. 61/587,446, filed on Jan. 17, 2012.

(51) Int. Cl.
*G06F 3/045* (2006.01)
*G06F 3/041* (2006.01)

(52) U.S. Cl.
CPC .............. *G06F 3/045* (2013.01); *G06F 3/0416* (2013.01)
USPC ......................................................... 345/174

(58) Field of Classification Search
None
See application file for complete search history.

(56) References Cited

U.S. PATENT DOCUMENTS

2011/0050634 A1*   3/2011   Lin et al. ..................... 345/174

\* cited by examiner

*Primary Examiner* — Nicholas Lee
(74) *Attorney, Agent, or Firm* — King & Spalding L.L.P.

(57) ABSTRACT

A resistive sensing touch panel may include row receiver tracks and column drive tracks. A controller may send and receive control signals and sense signals, respectively, to and from the resistive touch panel. The resistive touch panel may provide sense signals when a touch of the panel is detected. The sense signals may be sampled on a number of rows. When sampling a given row, the controller may change the termination of that row by coupling the end of the sampled row to a resistor having a higher value then terminating resistors coupled to the end of non-sampled rows that are adjacent to the sampled row. The controller may further pull the terminating resistors coupled to the end of the non-sampled adjacent rows to a supply rail voltage while the sampled row is being sampled.

1 Claim, 27 Drawing Sheets

*Example Resistor Values:*

R188, R190, R190, R195: 356 Ω

R186: 356 Ω at locations (2,0) and (2,155)
32.78 kΩ at locations (93,0) and (93,155)

R187, R189, R194, R196: 23.96 kΩ at locations (2,155) and (93,155)
1.64 kΩ at locations (2,155) and (93,155)

R191: 144 Ω

Location (2,0)     Location (93,155)

*Example Resistor Values:*

R256, R259, R262, R265: 144 Ω at location (2,0); 23.96 kΩ at location (93,155)
    R268, 270: 1.64 kΩ at location (2,0); 23.96 kΩ at location (93,155)
R257, R260, R263, R266, 269: 356 Ω
R258, R261, R264, R267: 50 kΩ

Novel Touch Panel of first type

Standard Touch Panel of first type

Novel Touch Panel of first type

Standard Touch Panel of first type

Novel Touch Panel of first type

Standard Touch Panel of first type

Novel Touch Panel of second type

Standard Touch Panel of second type

Novel Touch Panel of second type

Standard Touch Panel of second type

Novel Touch Panel of second type

Standard Touch Panel of second type

Novel Touch Panel of second type

Standard Touch Panel of second type

US 8,872,795 B2

RESISTIVE TOUCH PANEL WITH IMPROVED TERMINATION

PRIORITY CLAIM

This application claims priority to U.S. Provisional Application Ser. No. 61/531,534 titled "Resistive Touch Panel" filed Sep. 6, 2011, whose inventor is Lynn R. Kern, and further claims priority to U.S. Provisional Application Ser. No. 61/587,446 titled "Resistive Touch Panel with Improved Termination" filed Jan. 17, 2012, whose inventor is also Lynn R. Kern, and both of which are hereby incorporated by reference in their entirety as though fully and completely set forth herein.

BACKGROUND OF THE INVENTION

1. Field of the Invention

This invention relates generally to the field of touch panel design, and more particularly to the design of a resistive matrix touch panel.

2. Description of the Related Art

It's been a high priority for many electronics manufacturers to offer user interfaces that are powerful yet simple to use, while remaining highly reliable. Some of the more popular interfaces have been touchscreens and touchpads. Touchscreens and touchpads can typically detect the location of touches within the display/pad area, allowing the display/pad to be used as an input device, and in the case of touchscreens, making it possible for the user to directly interact with the display's content. Such displays/pads can be attached to computers, and have become more and more prevalent in recent personal digital assistants (PDAs), laptop computers, and satellite navigation and mobile phone devices, making these devices more user-friendly and effective.

Touchscreens/touchpads can be designed based on different sensing principles. The most widely used touchpads or touch panels (TPs) are designed based on capacitive or resistive sensing principles. Capacitive touchscreens/touchpads may feature a panel coated with a material that conducts a continuous electrical current across the sensor, which exhibits a precisely controlled field of stored electrons in both the horizontal and vertical axes to achieve capacitance. When the sensor's normal capacitive field (considered its reference state) is altered by another capacitive field, for example someone's finger, electronic circuits measure the resultant distortion in the characteristics of the reference field, and send the information about the event to a controller for processing. Capacitive sensors can either be touched with a bare finger or with a conductive device being held by a bare hand.

Resistive touchscreens are typically composed of two flexible sheets coated with a resistive material, and separated by an air gap or microdots. Most commonly, resistive TPs are constructed using one of two different types of metallic layers, referred to as matrix and analogue, respectively. In a matrix TP, striped electrodes are configured to face each other on substrates such as glass or plastic. In Analogue TPs, transparent electrodes without any patterning are configured to face each other. When contact is made with the surface of the TP, the two sheets are pressed together, causing the horizontal and vertical lines present on the two sheets to be pushed together and register the precise location of the touch. Resistive TPs provide accurate touch control, and because they are responsive to surface pressure, contact can be made with nearly any object (e.g. a finger, stylus/pen, etc.). Resistive sensing technology is therefore considered to be "passive".

For example, during operation of a four-wire TP, a uniform, unidirectional voltage gradient is applied to one of the sheets, and when the two sheets are pressed together, the second sheet measures the voltage as distance along the first sheet, to provide one of two (x,y) coordinates. Once the first coordinate has been acquired, the voltage gradient is applied to the second sheet to ascertain the other coordinate to register the exact touch location as contact is made. Because resistive TP technology works well with almost any pointer object, and can be operated with covered as well as bare fingers, they can oftentimes be more desirable than a capacitive TPs, which have to be operated with a capacitive pointer, such as a bare finger, for example. The matrix touch panel relies on much the same technology, with the difference that one sheet is patterned in the "X" direction, while the other sheet is patterned in the "Y" direction. The "Y" patterned films are referred to as column or driver tracks, the "X" patterned film is referred to as the row or receiver tracks.

Due to the sensing technology used in their design, resistive TPs can also support multi-touch input. However, most present day matrix touch panels reduce the useable signal by as much as 50× because of the termination values and techniques used. As a result, the RTL (register transfer language) and firmware that are required to extract the signal and produce usable multi-touch capability are limited. Also, each application has to be tuned individually, since the impedance of the TP is driven by optical, not electrical performance (as opposed to capacitive touch sensing). Current solutions use a termination scheme that results in approximately 70%-99% attenuation of the signal. Also, the "RC" network varies over the TP, and tuning resistors are used to slow all responses down, intentionally disposing of otherwise available portions of the signal through the termination schemes.

Many other problems and disadvantages of the prior art will become apparent to one skilled in the art after comparing such prior art with the present invention as described herein.

SUMMARY OF THE INVENTION

In one set of embodiments, a resistive sensing circuit may comprise some row receiver lines that are terminated to $V_{DD}$ (a supply voltage level) instead of voltage reference (e.g. ground), to greatly increase the available signal for sensing. An effective "guard band" is thereby created around the signals being sampled, reducing the overall effect of the RC network because 3 are now in parallel, and resulting in a net effect of a much higher amplitude signal. In addition, the termination resistor may be increased to include the currently used series resistor to increase the signal amplitude. Since the net resistance to ground remains the same, there is little or no effect on the overall impedance, while improving both the DC and transient response of the TP. The signal amplitude that is thereby produced is higher than in most present day solutions, which use a 10 kΩ resistor to terminate the sampled signal, after applying as much as 50 kΩ in series to equalize the signals, producing a 6:1 attenuator, and slowing the impulse response of the TP.

In one set of embodiments, with the methods combined—i.e. some row receiver lines terminated to $V_{DD}$, and the termination resistor increased—the sampling system may become capable of sampling eight rows in parallel. Present day solutions are limited to sampling channels serially. Thus, various embodiments of the improved resistive TP increase the overall bandwidth of the system while allowing each analog-to-digital (ADC) channel to operate slower. One specific improvement is the compressed response of the system. While present day solutions offer 10%-40% signal strength at the row receiver ADC, the signal strength in various embodiments of the improved TPs disclosed herein increases to 20%-60%. This greatly simplifies the signal processing, and reduces the analog circuit complexity. The termination and bias changes also result in improvements in the overall system performance and AC response of the system, as the parallel impedances to ground reduce the overall impedance.

A controller may be used to send and receive control signals and sense signals, respectively, to and from the resistive touch panel. The resistive touch panel may provide sense signals when a touch of the panel is detected. The sense signals may be sampled on a number of rows. When sampling a given row, the controller may change the termination of that row by coupling the end of the sampled row to a resistor having a higher value then the terminating resistors coupled to the end of non-sampled rows that are adjacent to the sampled row. The controller may also pull up to a supply rail voltage the terminating resistors coupled to the end of the non-sampled adjacent rows (i.e. the resistors terminating the non-sampled rows adjacent to the sampled row) while the sampled row is being sampled.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which.

Figure 1A:
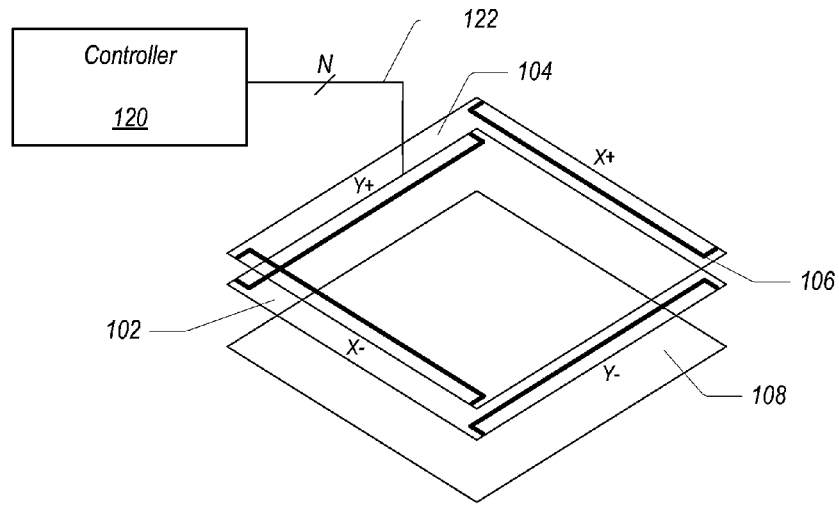
FIG. 1A is a diagram illustrating a resistive touch panel.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected.

DETAILED DESCRIPTION OF THE PREFERRED EMBODIMENTS

Various embodiments of a resistive sensing system may be incorporated into a touch panel (TP) capable of determining both position and pressure applied. The TP may also be capable of discerning multiple touches on a single plane. Most present day silicon TP solutions are saddled with major drawbacks that prevent optimal performance of the panel. In addition to design limitations, there is a major flaw in the discharge resistor (valued at 1.5 kΩ in most implementations) being connected between the non-sampled row receiver pin(s) and ground, greatly attenuating the signal from the TP by reducing overall sensitivity.

Figure 1B:
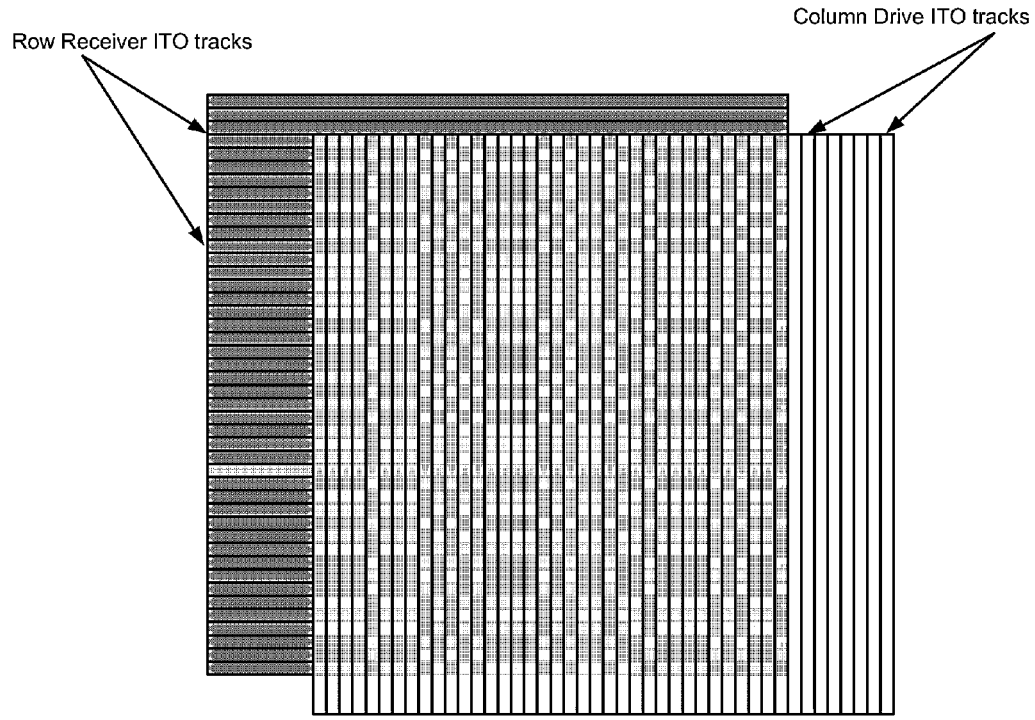
FIG. 1B is an illustration of the matrix row/column structure of the resistive touch panel (RTP) of FIG. 1A.

To better understand the principles applied to various embodiments of improved TPs disclosed herein, an analysis is provided below. As previously indicated, resistive touch screens consist of a glass or acrylic panel that is coated with electrically conductive and resistive layers made with indium tin oxide (ITO). The thin layers are typically separated by invisible spacers. An example of one embodiment of a resistive touch screen or touch panel system, including a controller is provided in FIG. 1. The TP includes a top side transparent conductor (ITO) 102, a bottom side transparent conductor (ITO) 104, and conductive bars 106. As also indicated, a third layer 108 made of an insulating material is also included. The matrix structure of the row receiver (ITO) tracks and column drive (ITO) tracks is shown in FIG. 1B. A controller 120 may be used to receive sensed touch signals via bus 122, which may include multiple wires, and may also send control signals to the resistive touch panel. For example, controller 120 may include an ADC used for digitizing received analog signals from the resistive touch panel, and generate the appropriate signals to the rest of the system (not shown, for the sake of simplicity).

Figure 2A:
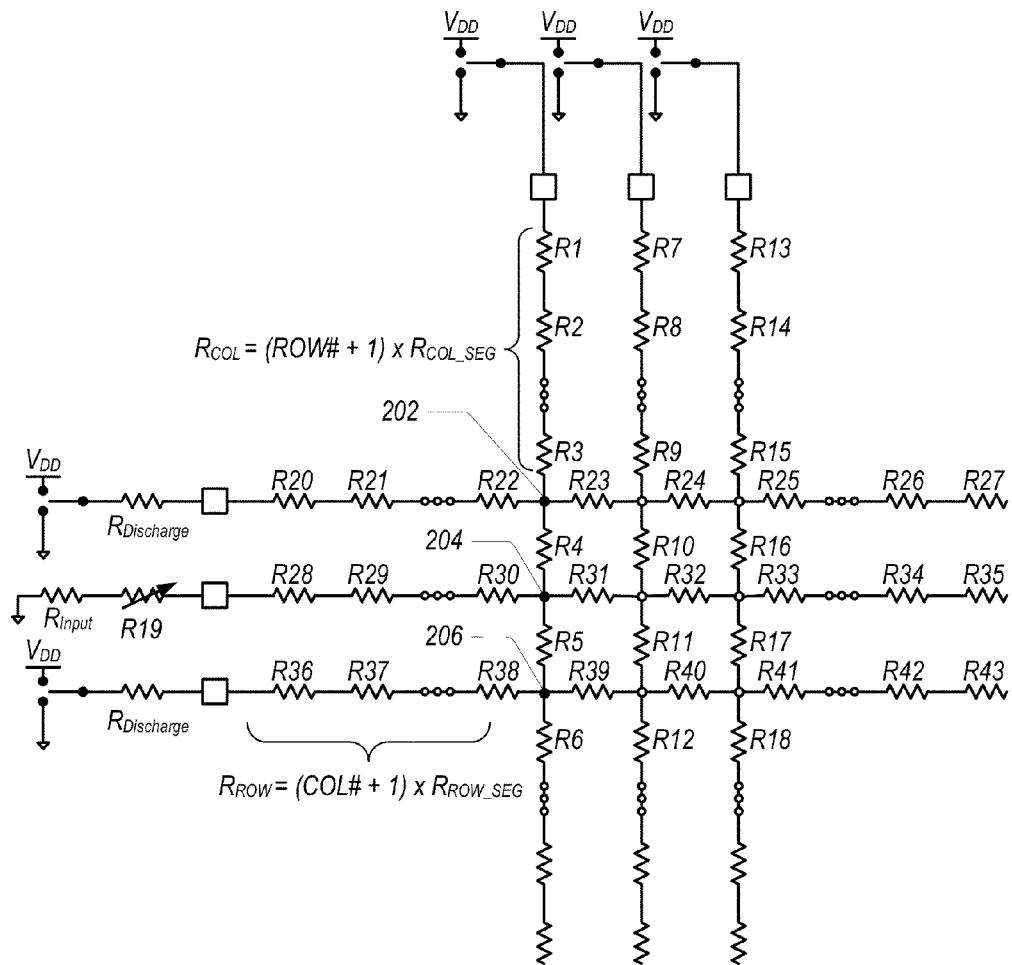
FIG. 2A is the circuit diagram of a simplified circuit model of the resistive touch panel used for DC analysis.
Figure 2B:
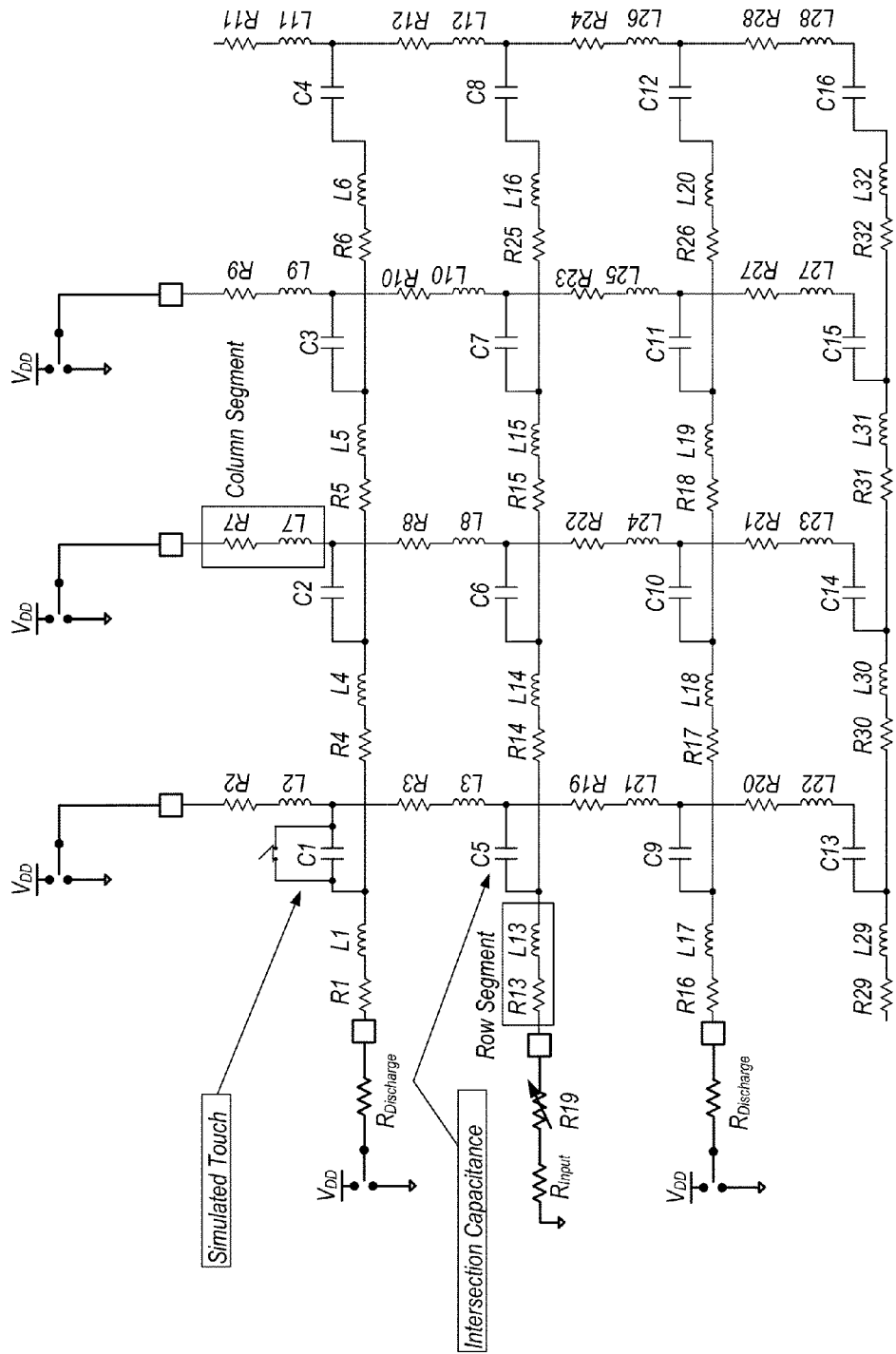
FIG. 2B is the circuit diagram of a more detailed circuit model of the resistive touch panel, used for DC analysis.
Figure 2C:
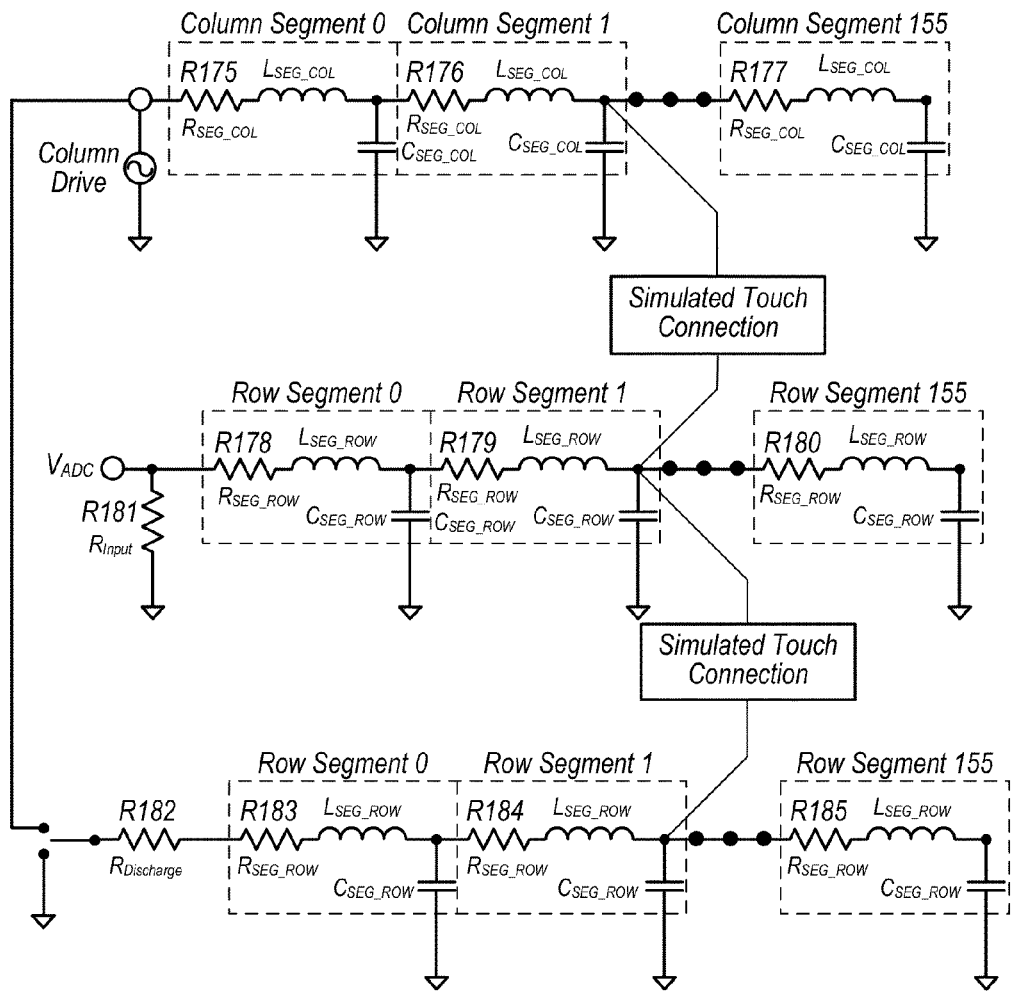
FIG. 2C is the circuit diagram of a circuit model of a resistive touch panel, used for transient analysis.

Models for touch panels used in DC analysis are shown in FIG. 2A and FIG. 2B, and a model for touch panels used in transient analysis is shown in FIG. 2C. For DC analysis, a resistive ladder structure is used as shown simplified in FIG. 2A and in more detail in FIG. 2B, while the Transient analysis relies on RLC networks as shown in FIG. 2C. As seen in FIG. 2B, a touch may be simulated as a short across the intersection capacitance. The circuits in FIGS. 2A, 2B, and 2C are partial representations showing only a few rows and columns of all rows and columns that may actually be configured on the resistive touch panel.

Figure 3:
FIG. 3 is an excerpt from a mechanical drawing file showing the ITO pattern of one embodiment of the resistive touch panel.

In order to determine the best possible signal processing techniques, it is desirable to have a good model of the "sensor". An initial analysis may be performed using a "virtual" 4:3 aspect ratio TP with 103 rows and 137 columns. Based on one set of requirements (or specifications) for one particular embodiment, a 96×156 resistive touch panel (also referred to herein as TP) mechanical design is considered. Various analyses may be based on that mechanical package, since it is possible to get physical extents to determine actual circuit element values. FIG. 3 provides excerpts from the mechanical drawing file of the TP under analysis, showing the ITO (Indium Tin Oxide) pattern. The intersections creating the capacitance show 0.1 mm per side, with 1.44 mm or 1.32 mm centers on the tracks.

Capacitance

The capacitance values may vary according to the specific manufacturer. For this analysis, the capacitance values are assumed to be in the range of 300 pF to 1.0 nF.

Inductance

For this analysis, the inductance created by the loop is ignored, focusing on the inductance just from the conductor. A small value of 105 pH was chosen for this analysis.

Resistance

For the TP under analysis, resistor values range from 50/60 kΩ to 100 kΩ, with specific resistivity expected for rows and columns. The equations used are shown below. The resistivity is specified as 100 Ω/sq for rows on glass, and 270 Ω/sq for columns on flexible film.

$$R_{ROW} = \rho_{ROW} \times Track\_Length \times Track\_Width$$

$$R_{ROW} = 100 \ \Omega/sq \times 224.54 \times 0.1 = 22.45 \ k\Omega$$

$$R_{COL} = 270 \ \Omega/sq \times 126.62 \times 0.1 = 34.21 \ k\Omega$$

The effective resistance of each segment may then be given by dividing this value by the number of dots in that direction. The $R_{SEG\_ROW}$ value is therefore obtained/specified as 144Ω, and $R_{COL\_SEG}$ value is therefore obtained/specified as 356Ω.

DC Analysis in a First Embodiment

In one embodiment, a TP with a ~16:9 aspect ratio using a total of 252 input/output (I/O) pins for 156 rows and 96 columns may be selected. The diagram in FIG. 2B shows a pertinent portion of the assumed panel, and how to calculate the resistance values between the sites being touched and the edge of the column drive or row receiver. In FIG. 2A, the shaded nodes at the resistor intersections (nodes 202, 204, 206) indicate points where the TP (matrix) is touched. The open nodes (or open circles) at the resistor intersections indicate points where the TP (matrix) remains untouched. As shown in FIG. 2B, a simulated touch is represented by a short across the intersection capacitance of the intersections in the driven column. Analysis is provided for a single column driven, and multiple touches occurring on that column. The variable resistor R19 is not included in this analysis.

The analysis shows the detrimental effects of terminations to ground, both in the sampled row and in the adjacent rows. Since some of the applications are human touch, the potential for five adjacent rows to be touched is probable. In one set of embodiments, in an novel resistive touch panel, three features may operate to increase the DC voltage presented to the analog-to-digital converter (ADC): increased termination resistors to ground, increased column drive voltage, and/or termination of the non-sampled rows to a voltage value other than the voltage reference, i.e. in this case to a value other than ground. In one set of embodiments, these features may be implemented as part of the functionality of a controller used to send and receive signals to and from the resistive touch panel, to interface the resistive touch panel with the rest of the system. One example of a touch panel with a controller was previously shown in FIG. 1A. To determine the effects of the termination resistors on the rows, a minimum number of five rows are examined, the row being sampled, and two rows on each side, presenting a simulated touch spanning five rows on a column.

The analysis may be performed for three different cases, as listed below.

[1] The controller termination is specified without $R_{DISCHARGE}$ on the sampled channel.
[2] One adjacent row on each side of the sampled row is terminated to $V_{DD}$ instead of ground.
[3] The resistance of the sampled row termination is increased from a lower value to a higher value for the sampled row (e.g. from 10 kΩ to 50 kΩ).

Figure 4:
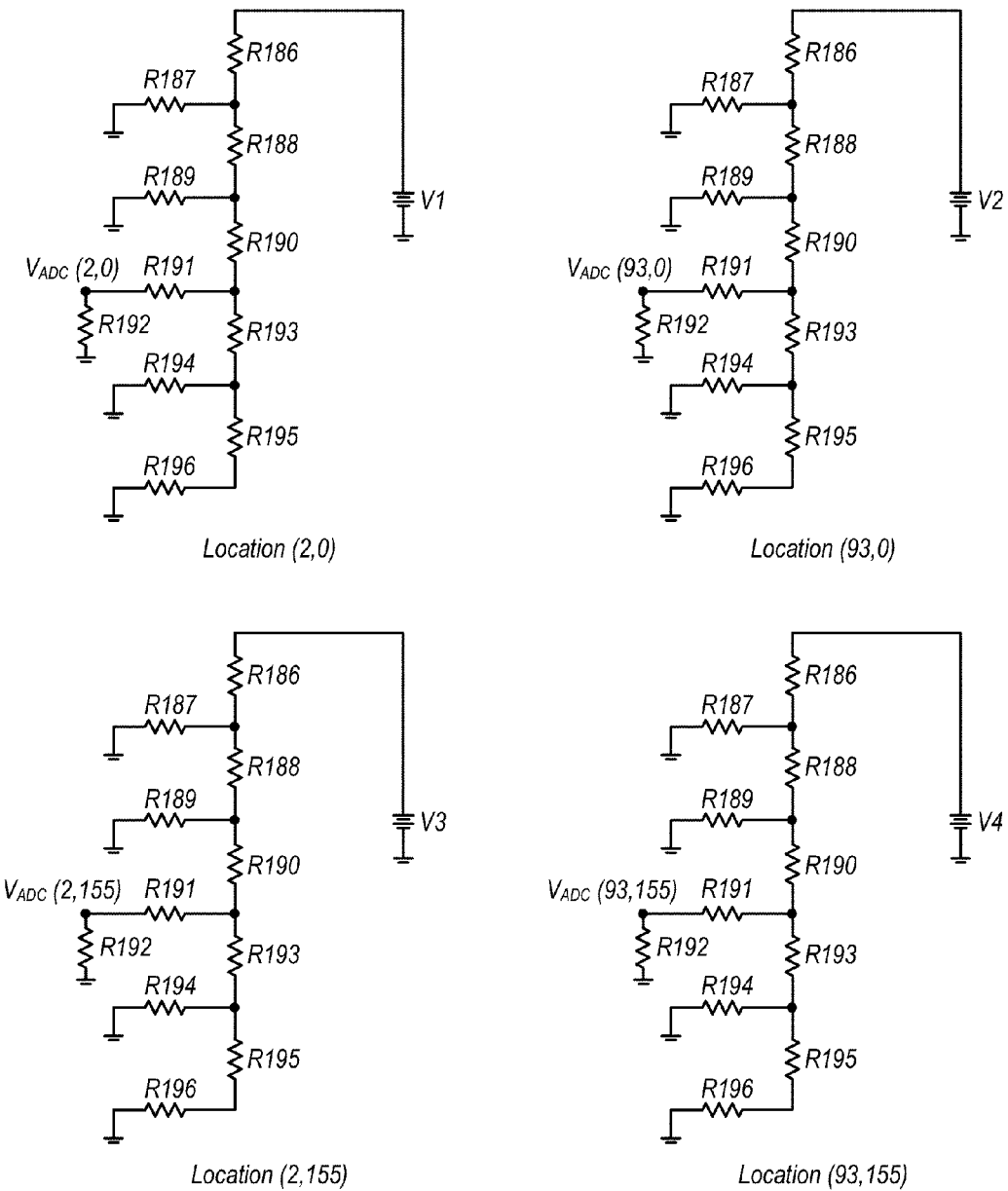
FIG. 4 is a circuit diagram showing the simulation circuit connected for examining the effects of resistive termination on resistive touch panel DC bias for four different locations of the resistive touch panel.

In all cases, the $R_{COMP}$ resistors are set to 0Ω. The initial simulation circuit is directed at examining the effects of termination near the (0,0) location of the TP, and is shown in FIG. 4. Using a 1V (DC) bias, the attenuation percentage is the mV (millivolt) reading multiplied by 10 (i.e. 335.2 mV is a 33.52% signal). The respective ADC voltage values ($V_{ADC}$) provided for each of the four corners (four locations) demonstrate how the termination (or input) resistors (R192) negatively affect the voltage available for the digitizer to process. In the example shown in FIG. 4, for the indicated example resistor values, and for a value of 10 kΩ for R192, $V_{ADC}$ is 335.2 mV, at location (2,0), 10.29 mV at location (93,0), 795.12 mV at location (2,155), and 98.26 mV at location (93,155).

Figure 5:
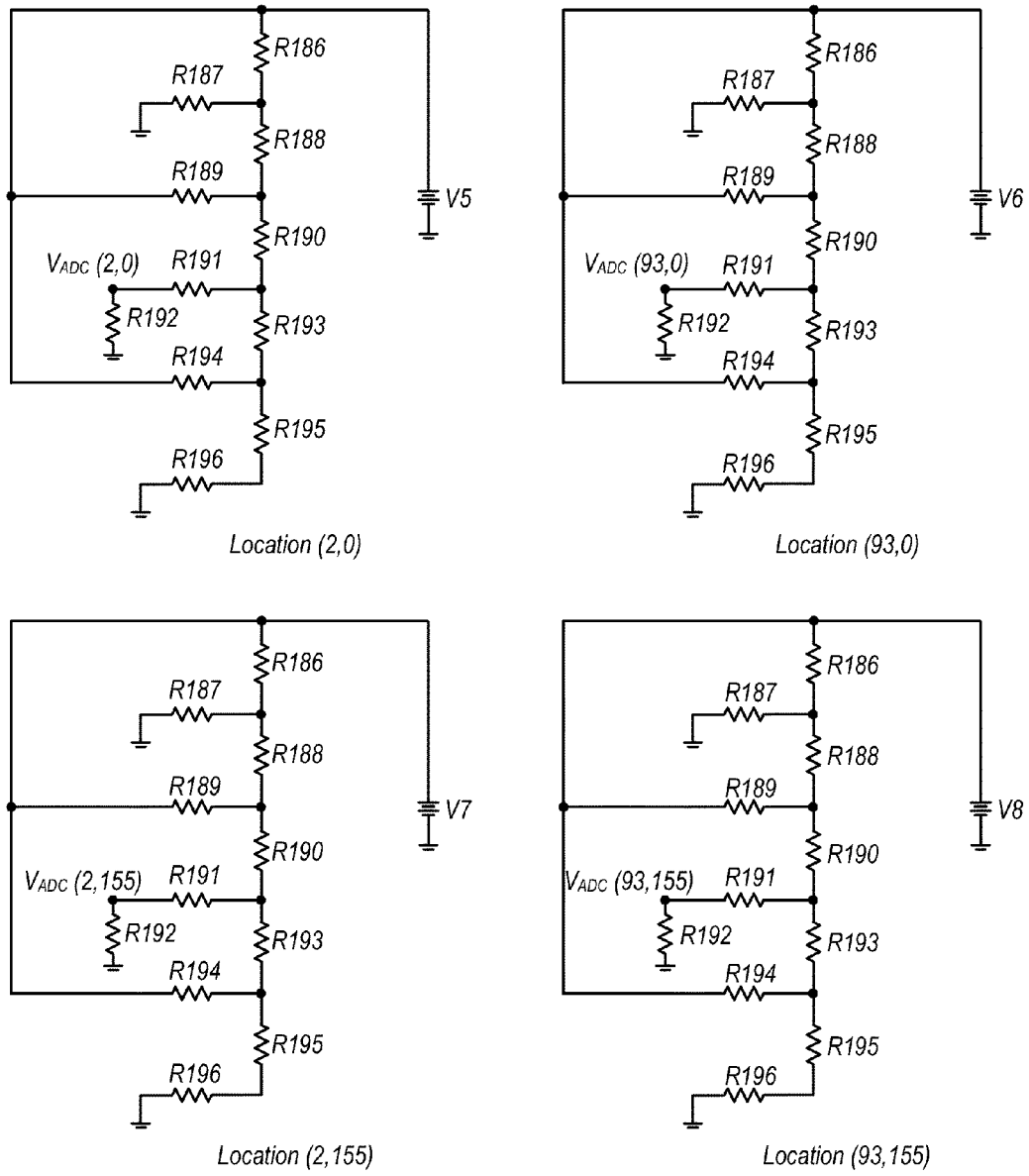
FIG. 5 is a circuit diagram showing the simulation circuit connected for examining the effects of $V_{DD}$ termination and/or a combination of $V_{DD}$ and resistive termination on resistive touch panel DC bias at the four different locations of the resistive touch panel.

FIG. 5 shows the simulation circuit of FIG. 4, but with the adjacent resistors terminated to $V_{DD}$ instead of ground, through discharge resistors $R_{DISCHARGE}$ (R189 and R194). Terminating these resistors to $V_{DD}$ has an advantageous effect on the DC bias, as evidenced by the values of $V_{ADC}$ for the various locations. In the example shown in FIG. 4, for the indicated example resistor values, and for a value of 10 kΩ for R192, with R189 and R194 both terminated to $V_{DD}$, $V_{ADC}$ is 699.77 mV, at location (2,0), 515.3 mV at location (93,0), 854.02 mV at location (2,155), and 375.41 mV at location (93,155). There is both an improvement in the absolute numbers and in the distribution. The distribution is shifted from ~30-80% to 37-85%, indicating that a much simpler signal processing arrangement may be used.

Referring again to FIG. 4, the simulation results may also be obtained for a configuration in which increased $R_{INPUT}$ termination is used to more closely approximate the TP impedance. Accordingly, the termination (or input) resistor R192 may be increased, for example from 10 kΩ to 50 kΩ yielding different values for $V_{ADC}$ at the different locations. Specifically, in the example shown in FIG. 4, for the indicated example resistor values, and for a value of 50 kΩ for R192, $V_{ADC}$ is 352.17 mV, at location (2,0), 10.91 mV at location (93,0), 863.94 mV at location (2,155), and 136.92 mV at location (93,155).

Referring again to FIG. 5, the simulation results may also be obtained for a configuration in which both termination methods are used. That is, the increased $R_{INPUT}$ termination is combined with terminating one adjacent row on each side of the sampled row to $V_{DD}$. Specifically, in the example shown in FIG. 5, for the indicated example resistor values, and for a value of 50 kΩ for R192, with R189 and R194 both terminated to $V_{DD}$, $V_{ADC}$ is 735.19 mV, at location (2,0), 546.52 mV at location (93,0), 927.94 mV at location (2,155), and 523.11 mV at location (93,155). The combined termination method yields a much improved DC signal into the digitizer. While not as dramatic when used alone, there is still an improvement simply using the increased $R_{INPUT}$ resistance. The effects of both termination modifications reduce the signal range to less than 2×, which has the potential to greatly reduce the analog front end complexity.

Figure 6:
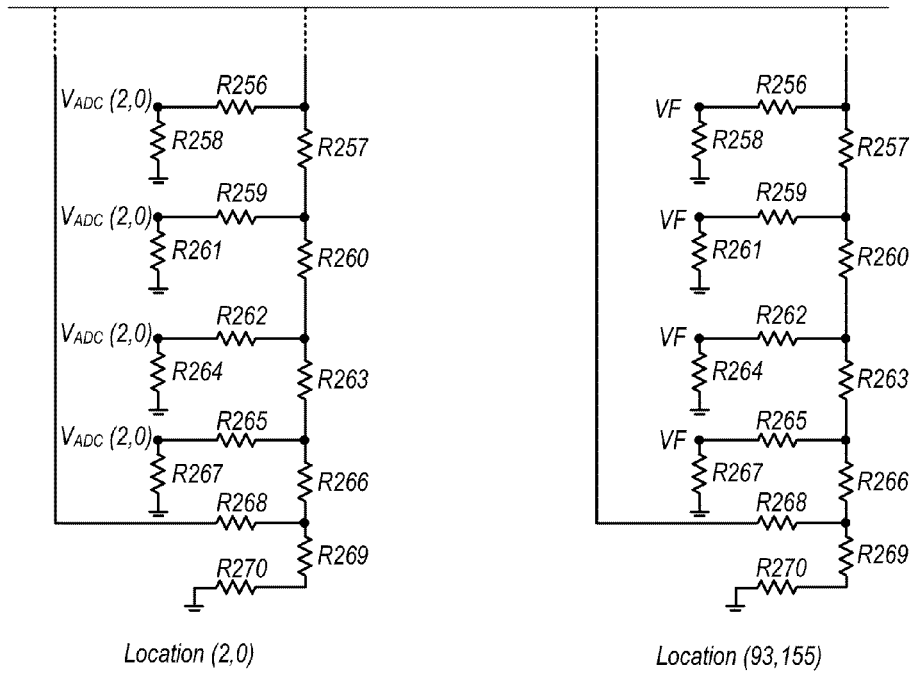
FIG. 6 is a circuit diagram showing the simulation circuit connected for examining the DC effects when multiple channels of an resistive touch panel are sampled simultaneously.

Referring to FIG. 6, simulation results may be obtained for a configuration which focuses on improving the system performance through parallel sampling. Specifically, in the example shown in FIG. 6, for the indicated example resistor values and configuration, at location (2,0) $V_{ADC}$ is 630.54 mV at R258, 609 mV at R261, 591.78 mV at R264, and 578.76 mV at R267. At location (93,155), VF is 229.91 mV at R258, 229.67 mV at R261, 230.53 mV at R264, and 232.51 mV at R267. In one embodiment, the architectural concept includes an 8-channel implementation, therefore the DC effects are examined for a configuration in which eight channels are sampled simultaneously. These simulations represent the corners of the TP with the best and worst-case responses. The table below summarizes the signal level improvements for each of the alternate termination schemes listed above. The first column in the table indicates the termination scheme, the second column provides results for location (2,155), the third column provides results for location (93,0), and the fourth column provides results for location (93,155). Clearly, a marked improvement may be obtained with the correct termination scheme.

| Termination modification | (2,155) voltage / change (%) | (93,0) voltage / change (%) | (93,155) voltage / change (%) |
| --- | --- | --- | --- |
| None | .795V | .010V | .098V |
| VDD $R_{DISCHARGE}$ | .854V (+7.4%) | .515(+50x) | .375(+2.82x) |
| 50KΩ $R_{INPUT}$ | .863 (+8.6%) | .011(+10%) | .137 (+39.8%) |
| Both | .927 (+16.6%) | | .523 (+4.34x) |
| 8-samples | .578 (−27.3%) | | .232 (+136%) |

DC Analysis in a Second Embodiment

In a second embodiment, a TP with a 4:3 aspect ratio using a total of 250 I/O pins for 103 rows and 137 columns may be selected, with a maximum expected resistance of 100 kΩ. The TP pattern is assumed to be square, meaning the resistance per segment in either row or column are equal. Again, the diagrams in FIGS. 2A and 2B show the assumed panel (simplified and in more detail, respectively), and how to calculate the resistance values between the sites being touched and the edge of the column drive or row receiver. As before, in FIG. 2A, nodes 202, 204, and 206 at the resistor intersections indicate points where the TP (matrix) was touched, and the unshaded nodes at the resistor intersections indicate points where the TP (matrix) was untouched. As indicated in FIG. 2B, a short across the intersection capacitance corresponds to a simulated touch. Analysis is again provided for a single column driven, with multiple touches occurring on that column, and without including variable resistor R19 in the analysis.

To determine the effects of the termination resistors on the rows, a minimum number of three rows are examined: the row being sampled, plus one row on each side of the sampled row, presenting a simulated touch spanning three rows on a column. Again, the analysis may be performed for the three different configurations as previously described. Specifically, in a first configuration the controller termination is specified without $R_{DISCHARGE}$ on the sampled channel, in a second configuration one adjacent row on each side of the sampled row is terminated to $V_{DD}$ instead of ground, and in a third configuration, the resistance of the sampled row termination is increased to 50 kΩ.

Figure 10:
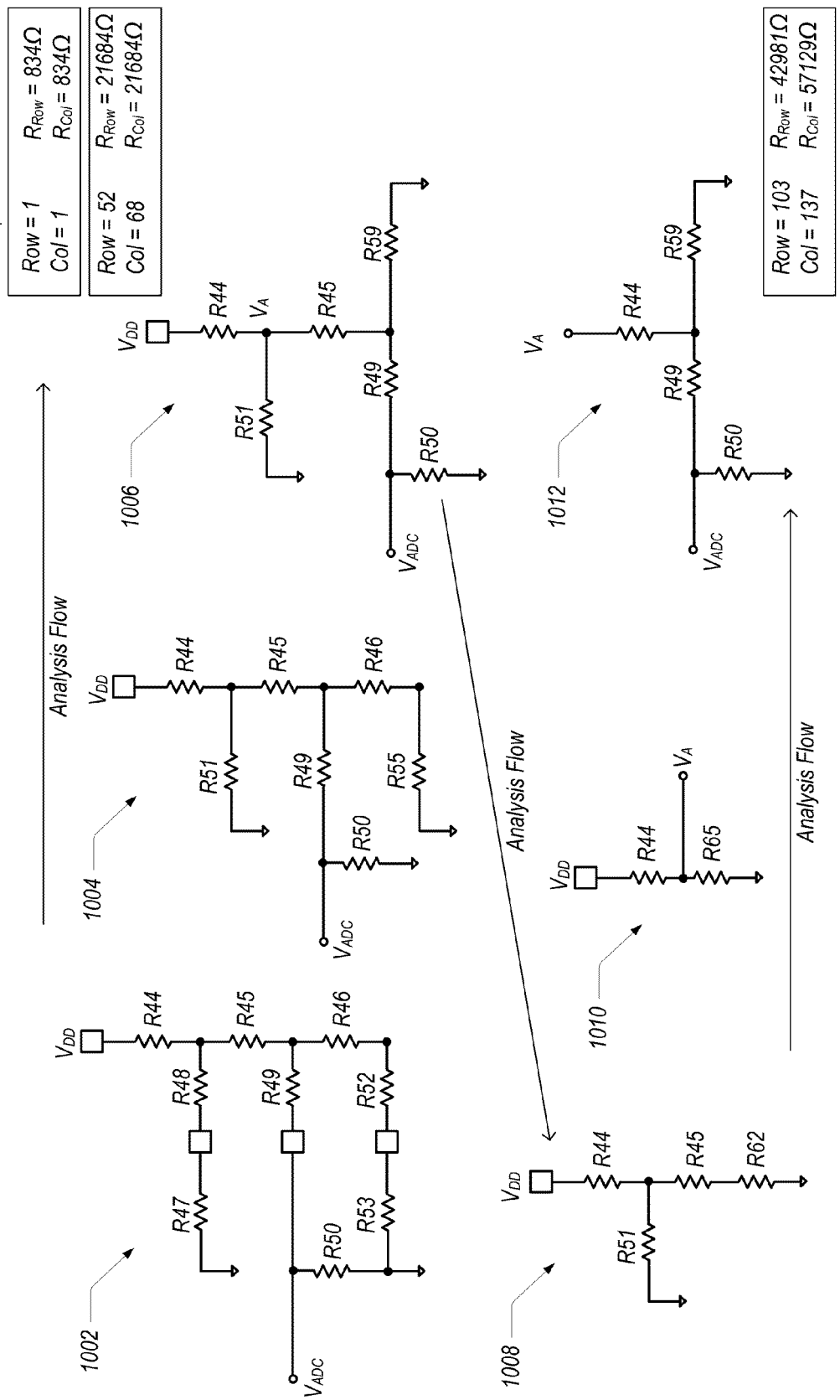
FIG. 10 shows a circuit diagram and analysis flow for examining the effects of termination, increased track resistance, and increased input (sampled row termination) resistance, near various locations of the resistive touch panel.

FIG. 10 shows an analysis diagram that may be used to illustrate the effects of termination near the (0,0) location of the TP. The analysis in this case includes combining certain resistors/resistances in order to obtain a simplified model. Thus, the analysis may start at circuit 1002, ending with circuit 1012. Accordingly, the analysis flow may be implemented as follows:
  i. The series resistances adjacent to the sampled row are combined. As seen in FIG. 10, R47 and R48 from 1002 are combined to form R48 in 1004, and R53 and R52 from 1002 are combined to form R55 in 1004.
  ii. The remaining series resistances are combined to simplify the diagram. As seen in FIG. 10, R55 and R46 from 1004 are combined to form R59 in 1006.
  iii. As seen in FIG. 10, the parallel resistances of (R50+R49) and R59 from 1006 are reduced to a single value of R62 in 1008.
  iv. As seen in FIG. 10, R51 from 1008 is combined in parallel with (R45+R62) from 1008, which yields R65 in 1010. A solution for node voltage $V_A$ is then determined.
  v. As seen in FIG. 10, circuit 1006 is then represented as circuit 1012, since node voltage $V_A$ has been determined, and by combining (R50+R49) and R59 in parallel into a single value R62, the $R_{ADC}$ voltage is calculated based on $V_A$, which itself has previously been determined based on $V_{DD}$.

The analysis diagram in FIG. 10 corresponds to an analysis showing the best possible response for a multiple touch on a given row. The three sites represent 3 mm on the TP, and would be reasonable for a human touch.

A first analysis may be performed at row 1, column 1, with the resistor values as indicated in FIG. 10 for that row/column combination, and with R50 specified to be 10 kΩ and R47 and R53 specified to be 1.5 kΩ. Note that for circuit diagram 1002, R45 and R46 each have a value of $R_{COL}/2$. Based on those example values, $V_A$ is determined to have a value of 0.596 $V_{DD}$, and consequently, $V_{ADC}$ is determined to have a value of 0.447 $V_{DD}$.

The same analysis as shown above may then be performed for the center of the TP at row 52 and column 68 (52,68) with the resistor values as indicated in FIG. 10 for that row/column combination, and the extreme of the TP at row 103 and column 137 (103, 137) with the resistor values as indicated in FIG. 10 for that row/column combination. These two analyses may be performed in order to determine the effects of increased track resistance, as in these cases $R_{ROW}$ and $R_{COL}$ represent cumulative track resistances. It should be noted again, that for these analyses the values of R45 and R46 remain at 417Ω. Based on the example values provided for location (52,68), $V_A$ is determined to have a value of 0.237 $V_{DD}$, and consequently, $V_{ADC}$ is determined to have a value of 0.0725 $V_{DD}$. Based on the example values provided for location (103,137), $V_A$ is determined to have a value of 0.214 $V_{DD}$, and consequently, $V_{ADC}$ is determined to have a value of 0.0397 $V_{DD}$.

As the analyses show, terminations to ground have adverse effects in the sampled row as well as in the adjacent rows. Since some of the applications include human touch, the potential for three adjacent rows to be touched is high. In one set of embodiments, three approaches are taken to help increase the DC voltage presented to the ADC: increasing the value(s) of the termination resistors to ground, increasing the column drive voltage, and/or terminating the non-sampled rows to a voltage potential other than a voltage reference (i.e. to a voltage other than ground). In a first deviation from the default setup, the adjacent rows may be connected to $V_{DD}$ instead of the voltage reference (i.e. instead of ground). All other rows may remain terminated at the voltage reference, pulling up only the rows situated on the sides of the row being sampled.

Since the response at the furthest site is small (as seen in the above analysis performed for location (103,137), that location (i.e. row 103 and column 137, in this embodiment) may be used in the next two analyses. A fourth analysis may be performed to demonstrate the effect of keeping the same values for R47 and R53 (in this example 1.5 kΩ), while increasing the value of the sampled row termination, i.e. resistor R50 from the previously used value of 10 kΩ to a new value of 50 kΩ. Based on the example values provided for location (103,137) as shown in FIG. 10, $V_A$ is then determined to have a value of 0.241 $V_{DD}$, and consequently, $V_{ADC}$ is determined to have a value of 0.128 $V_{DD}$, which indicates an increase of over 3× in the response by increasing the value of $R_{INPUT}$ (again, R50 in FIG. 10).

Figure 11:
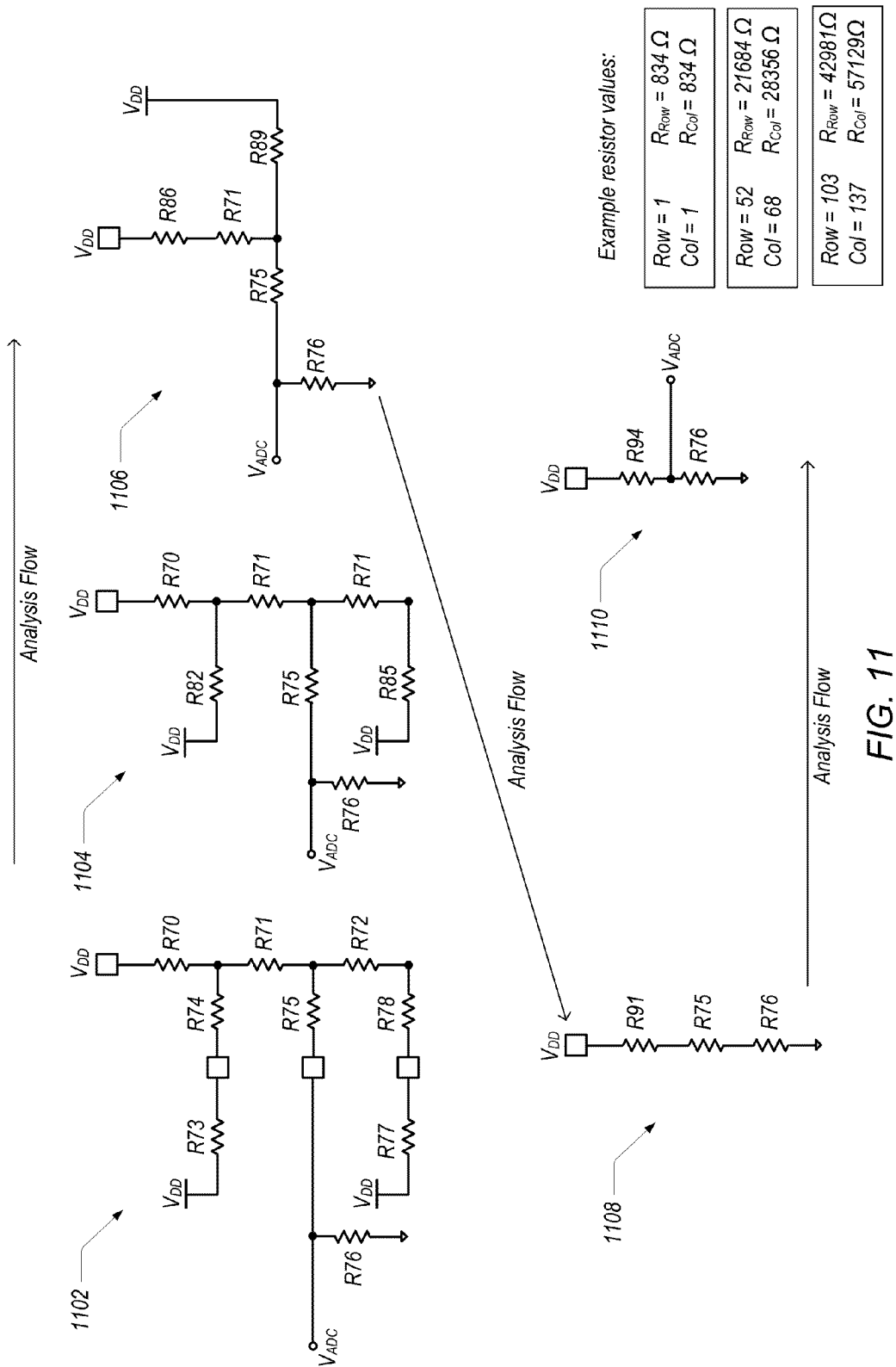
FIG. 11 shows one embodiment of a circuit diagram and analysis flow for examining the effects of termination, with adjacent rows connected to $V_{DD}$, with and without increased input resistance, at various locations of the resistive touch panel.

FIG. 11 shows an analysis diagram similar to FIG. 10, but in this case R73 and R77 (corresponding to R47 and R53, respectively, from FIG. 10) are terminated to $V_{DD}$ instead of the voltage reference (i.e. instead of ground, as was shown in FIG. 10). For this analysis, $R_{INPUT}$, i.e. R76 (corresponding to R51, from FIG. 10) is kept at 10 kΩ versus the 50 kΩ that was used during the previous analysis for this same location (103, 137). In this case, series R73 and R74 from 1102 are combined into R82 in 1104, and series R77 and R78 from 1102 are combined into R85 in 1104. In the next step, series R85 and R71 from 1104 are combined into R89 in 1106, and parallel R82 and R70 from 1104 are combined into R86 in 1106. Subsequently, parallel (R86+R71) and R89 from 1106 are combined into R91 in 1108. Finally, series R91 and R75 from 1108 are combined into R94. Based on the example values provided for location (103,137) as shown in FIG. 11, $V_{ADC}$ is determined to have a value of 0.145 $V_{DD}$. Thus, the results of the analysis indicate that this change increases the value of $V_{ADC}$ by more than 4×, contrasted to a configuration in which R73 and R77 would be terminated to ground.

Again, combining these two techniques (i.e. tying the termination of adjacent rows to $V_{DD}$ instead of ground, and using fixed, constant input resistors for the sampled row) yields substantial increases over using the techniques individually. The increased resistance to ground maintains a resistance close to the average resistance in the panel. Changing the termination from ground to $V_{DD}$ means the non-sampled row terminations actually pull the voltage higher, instead of creating parallel resistive dividers to ground. Thus, in one set of embodiments, a controller used for sending and receiving signals to and from a resistive touch panel may operate to switch to a fixed, higher value input (or terminating) resistor for the row(s) currently being sampled. The controller may also be operated to switch terminating resistors on a non-sampled row to a lower value resistor (by a factor of 5×, for example). The controller may in addition switch the terminating resistor on (non-sampled) rows adjacent to the sampled row to a voltage rail while the sampled row is being sampled.

Referring again to FIG. 11, analysis may be performed at the three physical locations examined above (i.e. for row 1/column 1, row 52/column 68, and row 103/column 137), to determine the effects of changing the termination by combining the two techniques. Thus, with R76 now increased from 10 kΩ to 50 kΩ, based on the example values provided for location (1,1) as shown in FIG. 11, $V_{ADC}$ is determined to have a value of $0.969 V_{DD}$. Similarly, based on the example values provided for location (52,68) as shown in FIG. 11, $V_{ADC}$ is determined to have a value of $0.624 V_D$. Finally, based on the example values provided for location (103,137) as shown in FIG. 11, $V_{ADC}$ is determined to have a value of $0.467 V_{DD}$. The analysis therefore clearly shows that changing the terminations can greatly affect the response to a touch. The range of the voltage to the ADC changes from $0.0397 V_{DD}$-$0.447 V_{DD}$ to $0.467 V_{DD}$-$0.969 V_{DD}$ when changing the termination as described above.

Figure 12:
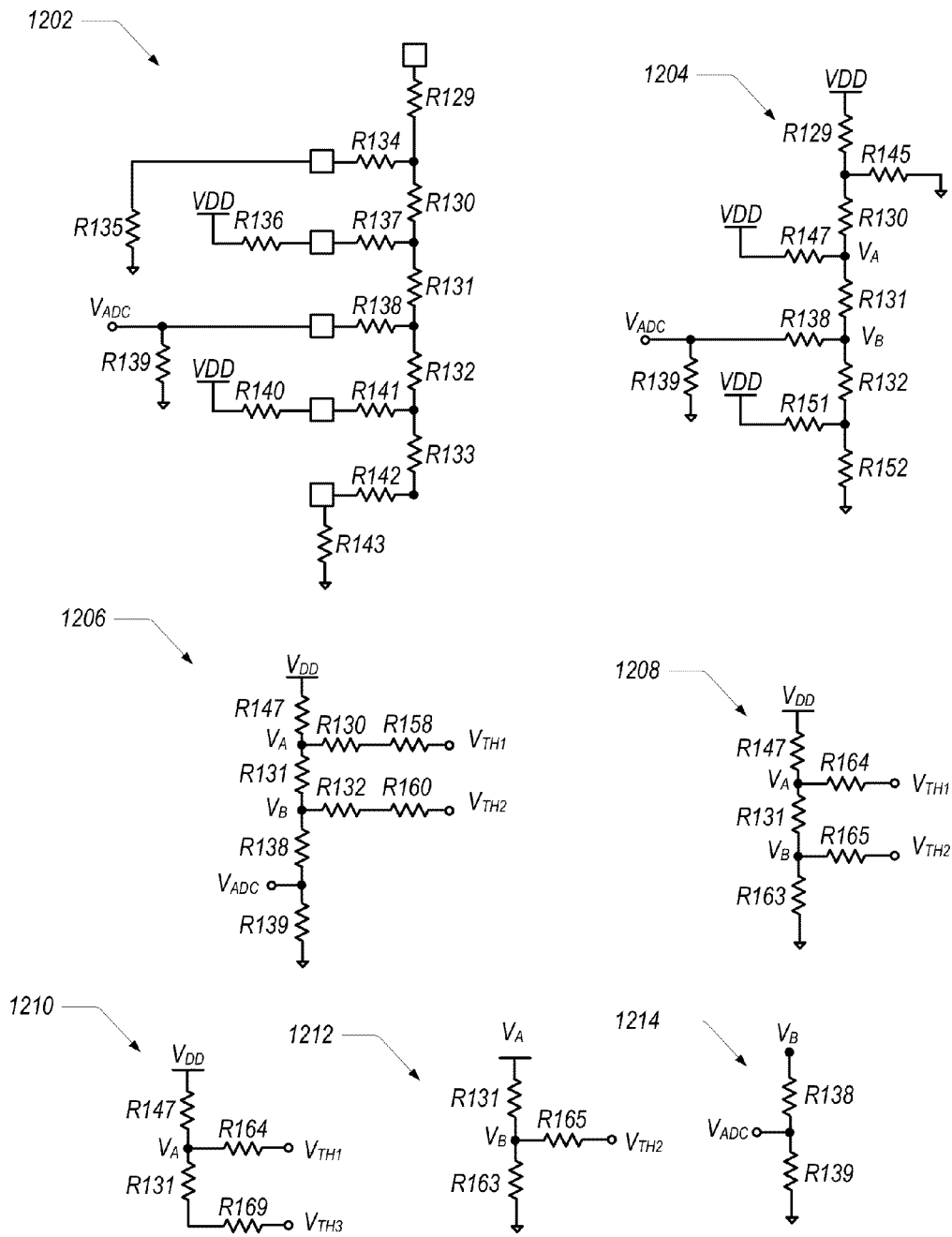
FIG. 12 shows one embodiment of a circuit diagram and analysis flow for examining the effects of termination, with adjacent rows connected to $V_{DD}$, with increased input resistance, for a touch spanning five columns, at a specific location of the resistive touch panel.
Figure 13:
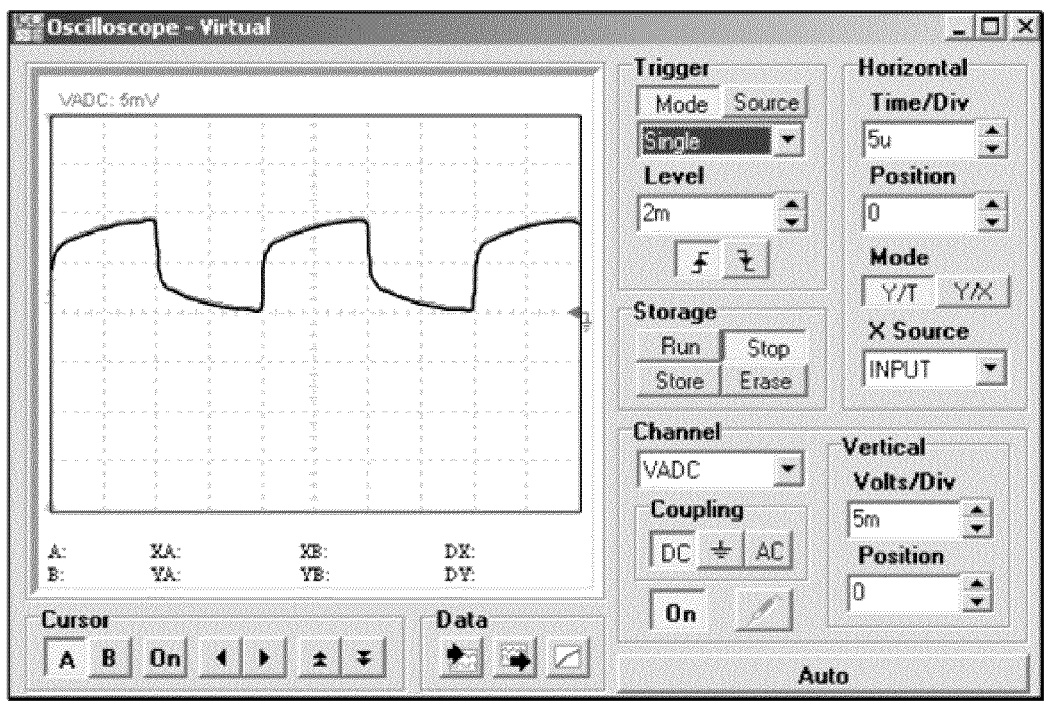
FIG. 13 shows an oscilloscope screen capture of simulation results for the analysis corresponding to FIG. 12, when a pull-up resistor is used.
Figure 14:
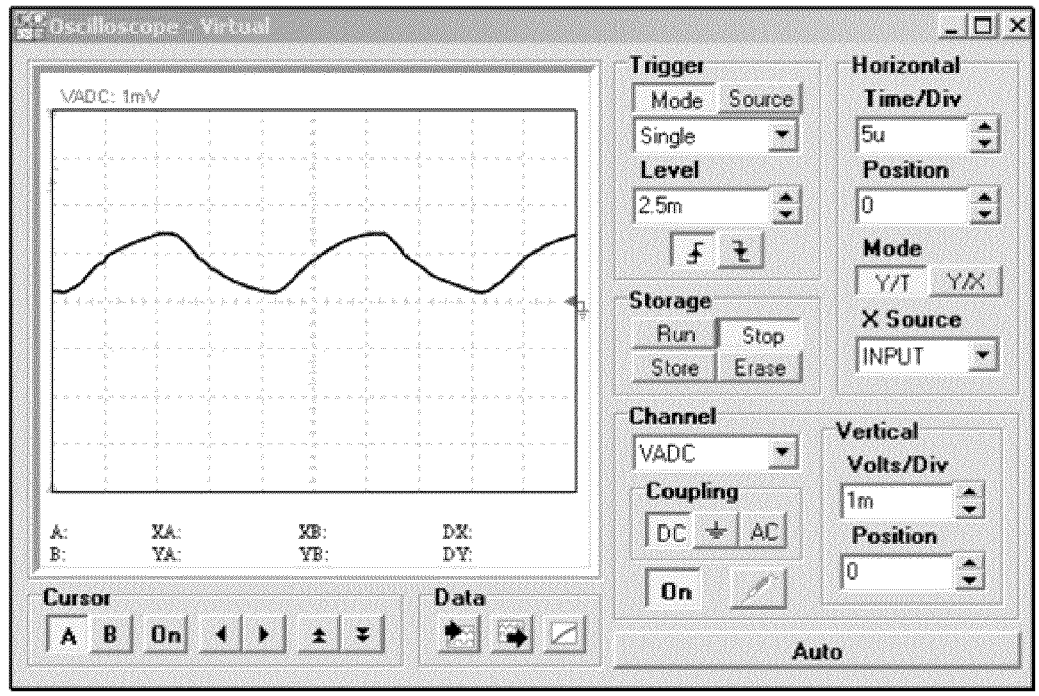
FIG. 14 shows an oscilloscope screen capture of simulation results for the analysis corresponding to FIG. 12, when a pull-up resistor is not used.

Analysis may also be performed to observe the effect of the new termination scheme on a touch spanning five columns. This requires much more in-depth analysis, as the network becomes difficult to manipulate. FIG. 12 shows the analysis diagram for analysis performed for a 5-row touch on a single column. The steps for this analysis are provided below. "KCL", which stands for Kirchoff's Current Law, is used for the node analysis required to resolve the final value for $V_{ADC}$. The Thevenin equivalent equations are shown further below, using expressions with the "TH" subscript (e.g. $V_{TH1}$, $R_{TH2}$, $R_{TH1}$, etc.). Thevenin voltage is calculated as the result of the simple resistive divider, and the resistance is the parallel combination shown, as the voltage sources are shorted to ground to determine the Thevenin resistance.

In this analysis, series resistors R135 and R134 from 1202 are combined into R145 in 1204, series resistors R136 and R137 from 1202 are combined into R147 in 1204, series resistors R140 and R141 from 1202 are combined into R151 in 1204, and series resistors R142 and R143 from 1202 are combined into R152 in 1204. Subsequently, parallel resistors R129 and R145 from 1204 are combined into R158 in 1206, and parallel resistors R151 and R152 from 1204 are combined into R160 in 1206, yielding Thevenin equivalent nodes $V_{TH1}$ and $V_{TH2}$. Series resistors R130 and R158 from 1206 are then combined into R164 in 1208, series resistors R132 and R130 from 1206 are combined into R165 in 1208, and series resistors R138 and R139 from 1206 are combined into R163 in 1208. Parallel resistors R163 and R165 are then combined into R169 in 1210, yielding Thevenin equivalent node $V_{TH3}$. The value of $V_A$ is then obtained based on circuit 1210, and circuit 1208 is then simplified down to circuit 1212. The value of $V_B$ is then determined based on circuit 1212, and circuit 1206 is simplified down to circuit 1212, from which the value of $V_{ADC}$ in terms of $V_{DD}$ is determined.

The equations for the analysis relating to FIG. 12 are as follows, for the example resistor values shown in FIG. 12:

$R_{TH1} = 44481 \| 57129 = 25008$ $R_{TH2} = 44481 \| 44898 = 22344$ $V_{TH1} = V_{DD} *(44481/101610) = 0.438 V_{DD}$ $V_{TH2} = V_{DD} *(44898/89379) = 0.502 V_{DD}$ $R_{TH3} = 92981 \| 22761 = 18284$ $V_{TH3} = 0.502 V_{DD} *(92981/115742) = 0.403 V_{DD}$ $((V_{DD}-V_A)/44481) + ((0.438 V_{DD}-V_A)/25425) + ((0.403 V_{DD}-V_A)/18703) = 0$ $(V_A-V_{DD})/44481 = ((0.438 V_{DD}-V_A)/25425) + ((0.403 V_{DD}-V_A)/18703)$ $V_A = 44481*[((0.438 V_{DD}-V_A)/25425) + ((0.403 V_{DD}-V_A)/18703)]$ $V_A = V_{DD} + 0.766 V_{DD} - 1.749 V_A + 0.958 V_{DD} - 2.378 V_A$ $4.127 V_A = 2.724 V_{DD}$ $V_A = 2.724/4.127 * V_{DD}$ $V_A = 0.660 V_{DD}$ $V_B/92981 = ((0.660 V_{DD}-V_B)/417) + ((0.502 V_{DD}-V_B)/22761)$ $V_B = 92981*[((0.660 V_{DD}-V_B)/417) + ((0.502 V_{DD}-V_B)/22761)]$ $V_B = 147.164 V_{DD} - 222.976 V_B + 2.051 V_{DD} - 4.085 V_B$ $228.061 V_B = 149.215 V_{DD}$ $V_B = 149.215/228.061 * V_{DD}$ $V_B = 0.654 V_{DD}$ $V_{ADC} = V_B * 50000/92981$ $V_{ADC} = 0.352 V_{DD}$

It should be noted that all resistor values are used for illustrative purposes only, considering that analysis performed using actual resistor values may be more easily presented and followed. However, alternative embodiments may use different values as desired, based on the actual touch pad implementation. Similar analysis may be performed for those values, according to the principles presented herein.

Transient Analysis

Figure 7:
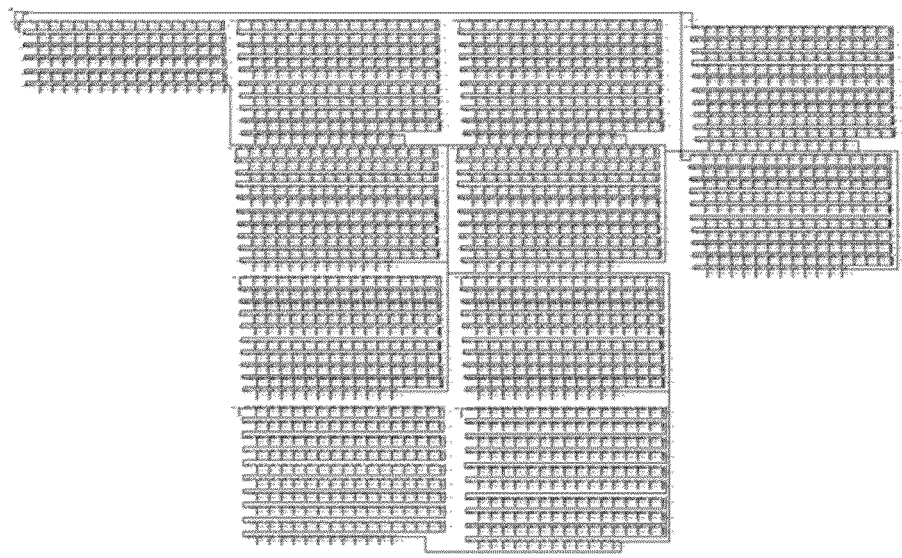
FIG. 7 shows a screen capture of the simulation model used for examining the pulse response of the column/row pair across the resistive touch panel.

The transient analysis may be focused on the pulse response of the column/row pair across the TP, in an attempt to bound the sampling problem, as the rise time of the signals in addition to the maximum DC value determines the signal level available to the digitizer. A simulation model for this analysis is shown in FIG. 7. The block on the far left represents a 96-segment column, and the 10 remaining blocks represent the 156-segment rows.

Figure 8A:
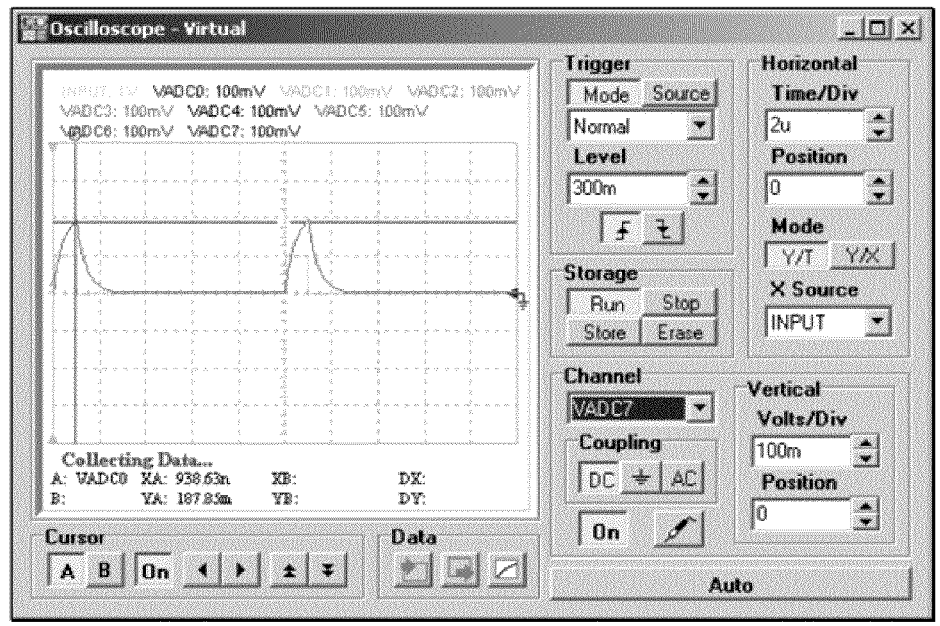
FIG. 8A shows an oscilloscope screen capture of simulation results for a resistive touch panel, with 8 simultaneous samples taken during a 1 μsec pulse when adjacent rows are connected to $V_{DD}$.
Figure 8B:
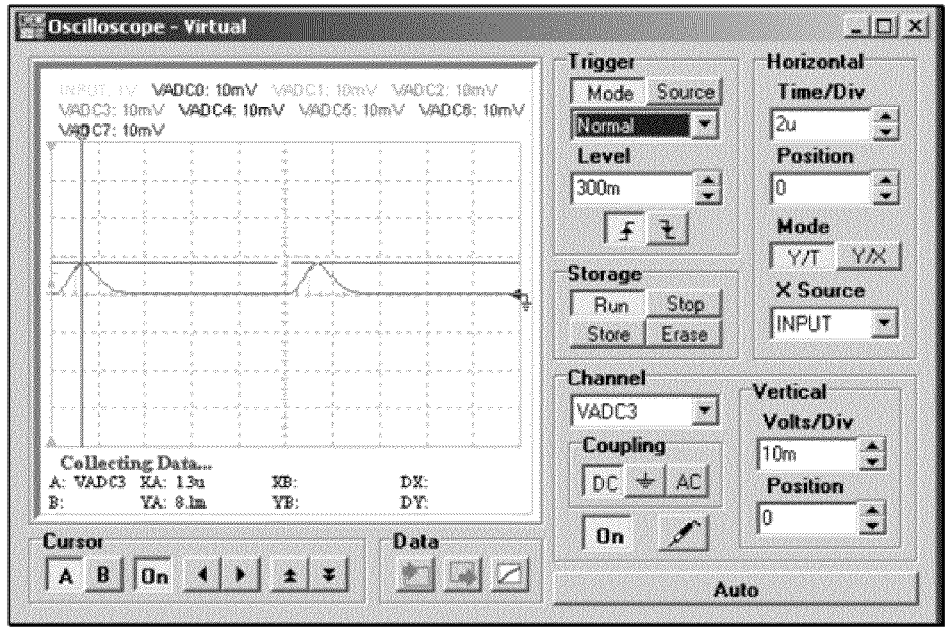
FIG. 8B shows an oscilloscope screen capture of simulation results for a resistive touch panel, with 8 simultaneous samples taken during a 1 μsec pulse when adjacent rows are connected to ground.
Figure 9:
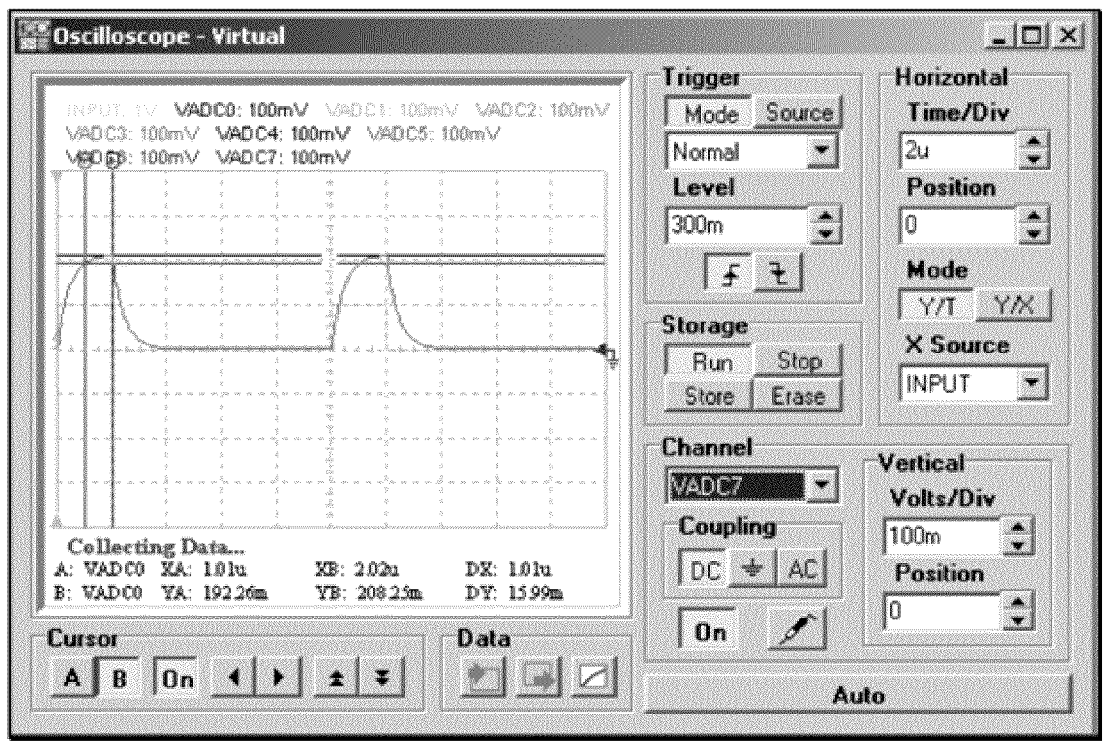
FIG. 9 shows an oscilloscope screen capture of simulation results for a resistive touch panel, with 8 simultaneous samples taken during a 2 μsec pulse when adjacent rows are connected to $V_{DD}$.

In a first simulation, $R_{INPUT}$ may be set to 50 kΩ, and the two adjacent rows may be switched between ground and $V_{DD}$ through the 1.5 kΩ $R_{DISCHARGE}$ resistor. In an actual system, this may be performed, for example, by controller 120, as shown in FIG. 1A. The matrix may be configured to use a single column point to drive all eight (8) rows. This may produce slightly inaccurate results, since adjacent connections on the column may actually be established, but $R_{SEG\_COL} \ll R_{ROW}$, thus the error may be considered to be negligible. Simulation results are shown in FIG. 8A and FIG. 8B for eight simultaneous samples taken for a 1 μsec pulse. The graph in FIG. 8A shows the voltage when adjacent rows are connected to ground, and the graph in FIG. 8B shows the voltage when adjacent rows are connected to $V_{DD}$. The improvement is just over 23× in voltage level at 1 μs. Taking eight (8) simultaneous samples means that the sample period for each channel may increase from 270 ns to 2.16 μs, which reduces the overall required bandwidth of the sampling/digitizing subsystem. FIG. 9 shows the simulation result for eight simultaneous samples taken for a 2 μsec pulse. As seen in FIG. 9, the difference in signal does not warrant additional sampling time. Doubling the sampling time yields a 16 mV, or 8.5% improvement in the signal.

The use of alternative termination schemes indicate there may be a substantial improvement in signal amplitude by implementing three changes with respect to the standard TP configurations: increasing the $R_{INPUT}$ resistance to 50 kΩ, enabling the use of pull-up, pull-down, or high-Z through the $R_{DISCHARGE}$ resistor, and eliminating the $R_{COMP}$ series resistors.

Termination

Figure 16:
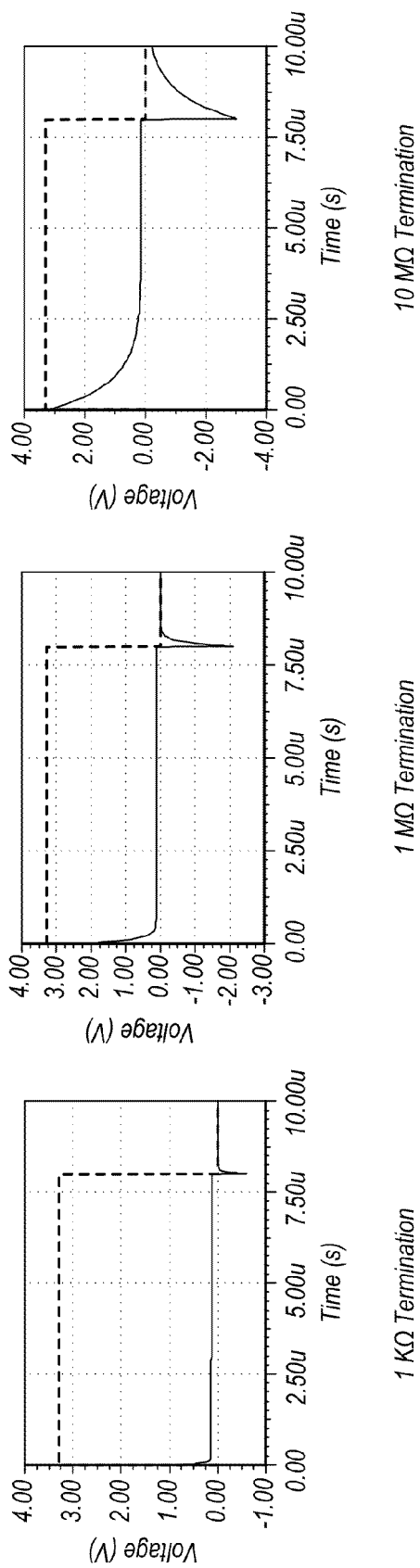
FIG. 16 shows timing diagrams illustrating simulation results of the effect of termination on settling time for a specified row of the resistive touch panel.

As described above, a novel approach to termination provides a more uniform response across the Touch Panel (TP) while providing a signal with higher amplitude to the ADC, when compared with most present day solutions. For example, while in most present day TP solutions the signal level is within the 50 mV-1.5V range, various embodiments of novel touch panels disclosed herein feature signal levels that may reach 2.75V. Through the use of higher valued termination resistors the response to a touch may also be increased. The maximum value of that resistor used is a function of the sample rate and size of the panel. The effect of a higher resistor (resistance) is the increase of the settling time of the impulse generated when a column is excited (FIG. 16 shows this). In a laboratory experiment, proving efficacy, both non-touch and touch voltage levels may be enhanced by using a simple scheme of 100 kΩ on every I/O pin, to ensure that no touch produces a lower voltage, and a touch generates near rail voltage. This provides a means for simulating real world signals throughout the design process using simple passive components representing the TP. In one embodiment, a touch panel using an FPGA and digital level translators may provide a demonstration of the sufficiency of a simple digital threshold technique for detecting potential touches in a modified-termination TP application.

Therefore, it is desirable to develop a reasonable simulation model of the touch panel (TP), determine the efficacy of alternate termination schemes in simulation, and provide validation of both the simulation model and an optimized termination technique in hardware. The effects of termination on the TP response to square pulse (transient) excitation may control the available signal level, and the integrity of the signal presented. It is also very desirable to have a SPICE model of the touch panel available when engaging in the silicon design. A representative model allows developers to use accurate models to evaluate the actual circuits being designed. Finally, investigation into various termination schemes though simulation may be used to develop a simplistic hardware solution to evaluate the performance of an optimal termination scheme. In addition, a comparative analysis of existing algorithms and the proposed termination methods described herein may also be helpful in evaluating new termination techniques when compared against those previously developed.

Testing performed on various touch panels may provide an overview of the benefits of the various embodiments of the novel touch panel control methods presented herein. Specifically, results obtained from testing performed on four different panels (that may be supported by the embodiments disclosed herein) are provided below. The identification (ID) numbers used herein are meant to differentiate between the different touch panels used during testing. It was observed that the part ID #SN371 has an abnormality around row 2, causing the signal to be attenuated when touched, at about 50%. The carbon nano-tube panel, part ID# SN349, also exhibits extremely low signal response. In addition, there appears to be a frequency dependency with the part ID #SN349 device, which may merit further investigation.

One of the concerns with using various different termination schemes is the effect when the target TP moves from a Classic ITO solution to a low impedance silver/pressure solution. Since the TP tracks have practically no resistance (100's of Ω or less), termination and the effect on power consumption is of interest.

While the simulation models previously discussed (re. DC and transient analysis, for example) feature a simplistic capacitive coupling scheme, that capacitive coupling scheme does provide a basic framework for evaluating the model when comparing with data taken from TPs being tested. Table 1 shows the results of the prior analysis performed for the given TPs. Note that the capacitance does not change, indicating that the rise time of the transient signal is only dependent on the track resistance of the particular TP. This holds true so long as the intermediate resistive layer does not impact the overall capacitance.

TABLE 1

Panel Type vs. Impedance

| Panel Type | ID | Size | Row × Col | ADC res | Sampling Scheme | BW (SPS) | Resist (Row, Col) | Seg/Tot Cap |
|---|---|---|---|---|---|---|---|---|
| Classic | 371 | 72 mm × 54 mm | 48 × 36 | 1 bit | Serial | 432k | 107, 536 | 1.74pf/145pf |
| Classic | 375 | 72 mm × 54 mm | 48 × 36 | 1 bit | Serial | 432k | 536, 107 | 1.74pf/145pf |
| Nano-tube | 249 | 72 mm × 54 mm | 48 × 36 | 5(8?) | Parallel | 84k | 536, 536 | 1.74pf/145pf |
| Resistive | 349 | 72 mm × 54 mm | 48 × 36 | 5(8?) | Parallel | 84k | 0, 0 +5k to 100k | 1.74pf/145pf |

Figure 15A:
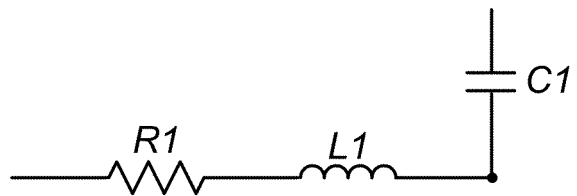
FIG. 15A shows a segment model of a row/intersection for one resistive touch panel.
Figure 15B:
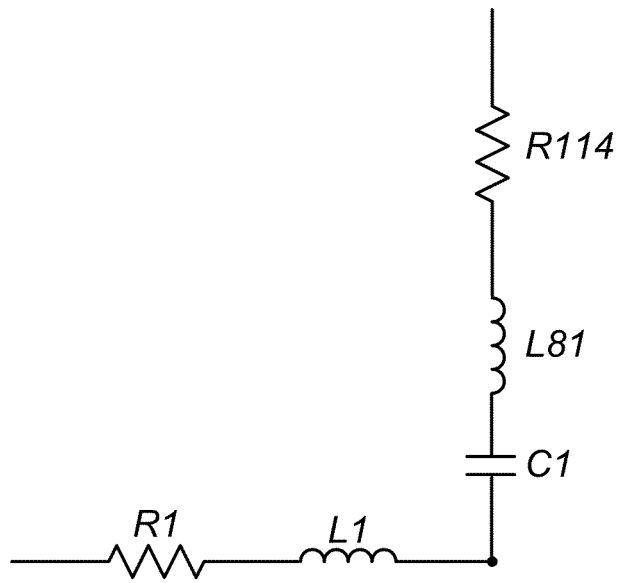
FIG. 15B shows a segment model of a row/intersection with lumped column impedance based on row position, for one resistive touch panel.

Using the data in Table 1, a simulation model may be developed. It should be noted that the missing parametric for all TPs is inductance. While small, there is evidence that an inductance is present in the TP. For modeling purposes, 100 pH may be assumed for each segment. Each row/intersection may be modeled as shown in FIG. 15A. The unattached end of the segment capacitor may be connected to a column drive. Since the simulator may have difficulty in resolving unterminated capacitance, the column impedance may be lumped based on row position, and connected to the top of the capacitor as shown in FIG. 15B. The values for the column are calculated as row# times Segment impedance (i.e., row#*$Z_{segment}$).

Figure 17:
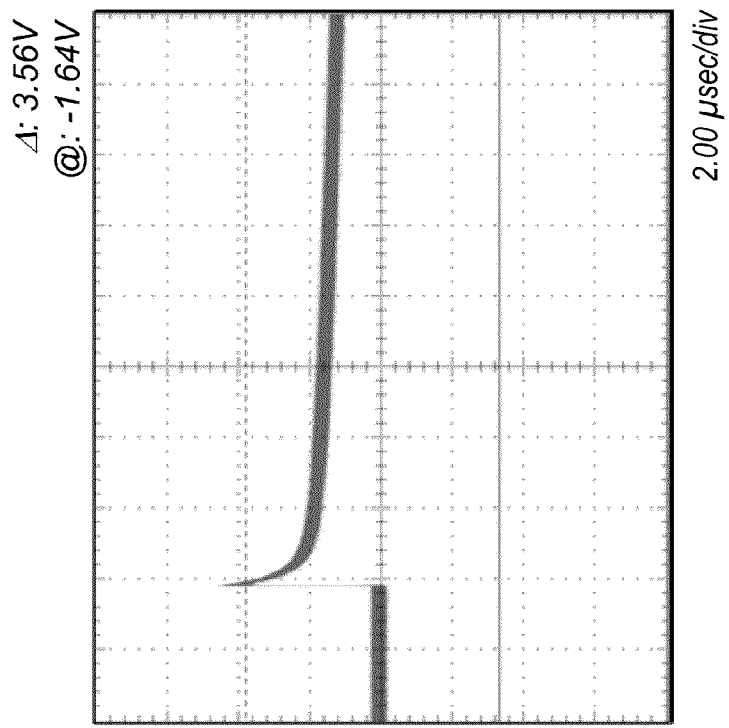
FIG. 17 shows timing diagrams illustrating hardware test results of the effect of termination on settling time at two different locations of the resistive touch panel, for an untouched response to a pulse.
Figure 17:
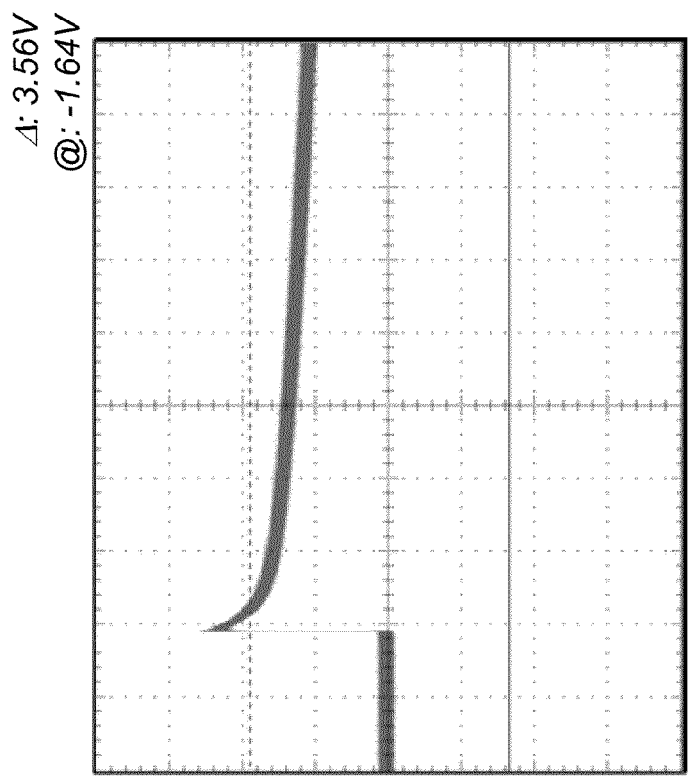
Figure 18A:
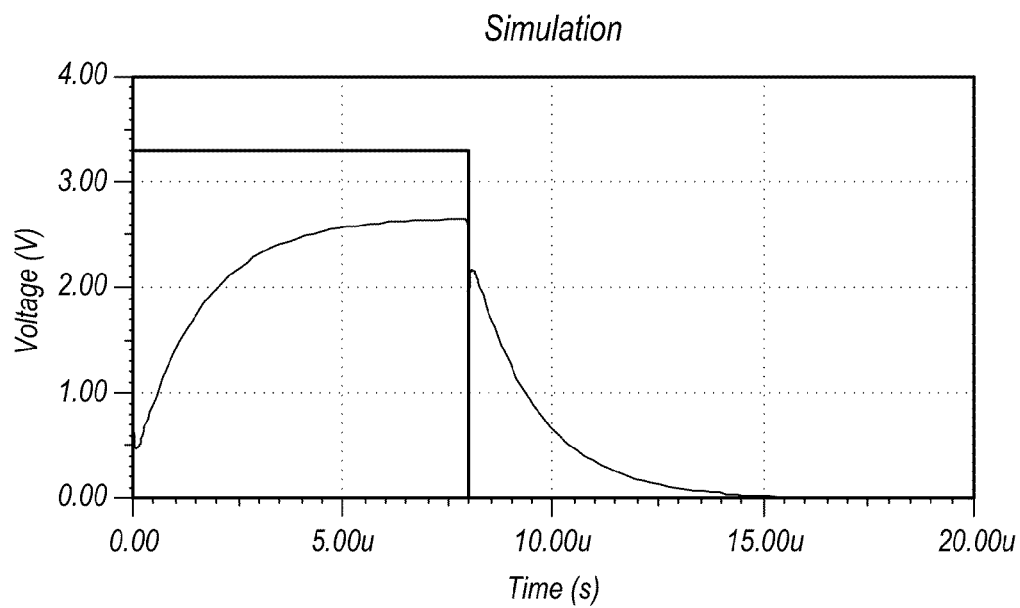
FIG. 18A shows a timing diagram illustrating simulation test results of the effect of termination on settling time at a location of the resistive touch panel, for a touch response.
Figure 18B:
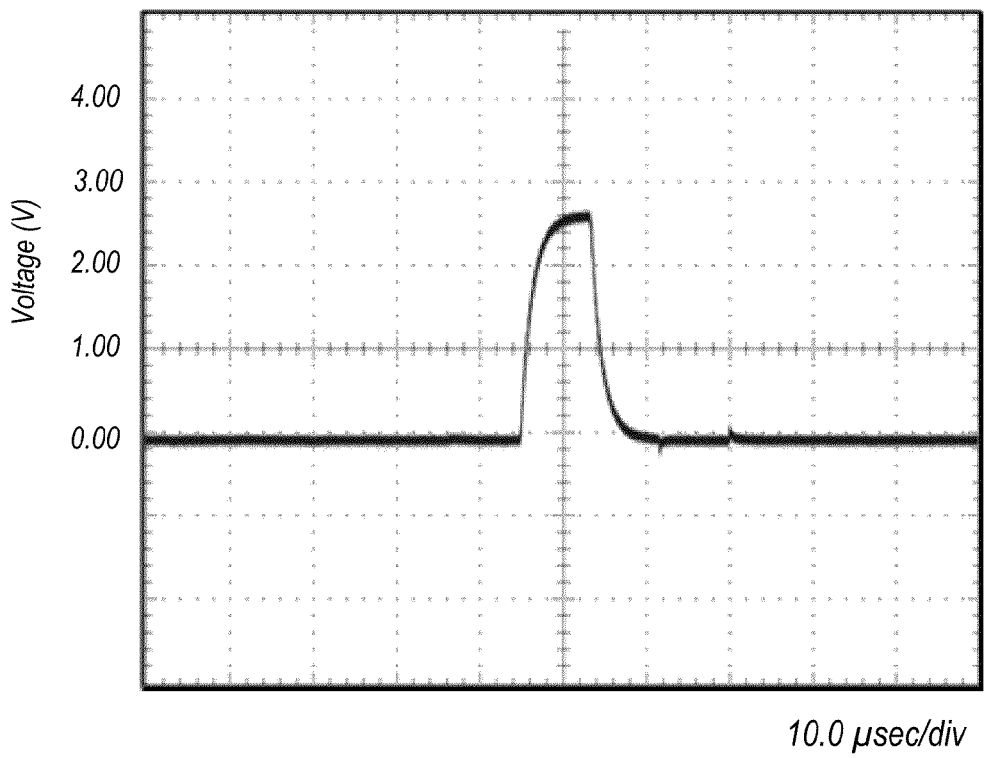
FIG. 18B shows a timing diagram illustrating hardware test results corresponding to the simulation test results shown in FIG. 18A.

Finally, the circuit may be completed by a termination of the column. The simulation results in FIG. 16 show the effect of termination on the settling time of row 36, when using the models from FIG. 1A and FIG. 1B is. Clearly, the simulation plots in FIG. 16 show that terminations between 100 kΩ and 1 MΩ are effective in greatly reducing the capacitive coupling that exists. The oscilloscope plots in FIG. 17 show the untouched response to pulses at row 36 on part ID #SN375. The measurements were taken using an FET probe with 10 MΩ resistance and less than 2 pF capacitance. The time constant for decay is slightly longer, as the capacitance in the model is lumped, which accounts for the longer tail. With the untouched response approximately correct, that is, the simulation closely matching the observed behaviour, the next step is to validate the touched response. Using a 100 kΩ resistor for all terminations for row and column, the simulation of a touch is shown in FIGS. 18a and 18B, which contain a first graph indicative of the simulation results, and a second graph indicative of the corresponding observed behaviour taken from the oscilloscope, respectively. A touch is defined as a short across the intersection capacitor shown in FIG. 15A.

It is significant to note in FIGS. 18A and 18B that the final amplitude, the shape of the rise time, and the shape of the decay are the same in the simulation plot and the observed results. While there may be some small differences between the simulated and actual responses, FIGS. 18A and 18B show that the model generated from Table 1 is accurate for a 1st order approximation of the response of the panel.

The algorithm corresponding to the quarter-sized panels includes several firmware builds. There are six variants of voltage range, with four termination schemes. To reduce the testing, the recommended firmware versions may be used, a Hi-Z version for the SN375 (Classic ITO) and the shorted to ground variant for SN349 (Silver/Resistive layer). Four signals may be used as metrics: rows 2 and 36, and columns 2 and 47. This provides a snapshot of the signal response across the panel. For this evaluation, a breakout board (8151_A0_MEC8000_LTP) may be used to gain access to the row and column signals.

The excitation for the evaluation of TPs featuring various embodiments of the termination methods disclosed herein may be performed through an FPGA build that decodes a count to repetitively generate a pulse on each column. There is no discharge time for the testing of the novel TPs, and the signals are non-overlapped by less than 1 clock cycle of the master clock. The period is fixed at 8.2 µs, or 119 kHz for the FPGA build.

Figures 19A, 19B:
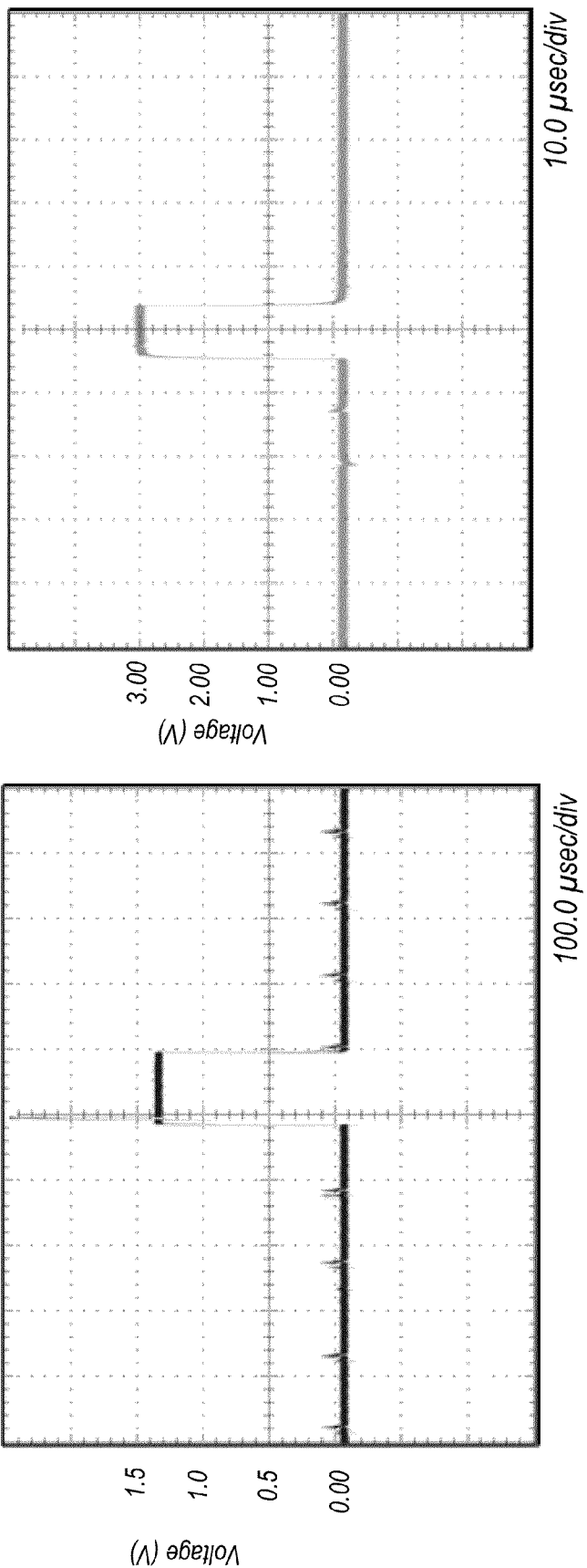
FIG. 19A is a timing diagram illustrating hardware signal response of a standard resistive touch panel of a first type to an excitation pulse at row 2, column 2.
FIG. 19B is a timing diagram illustrating hardware signal response of one embodiment of a novel resistive touch panel of the first type to an excitation pulse at row 2, column 2.
Figure 20B:
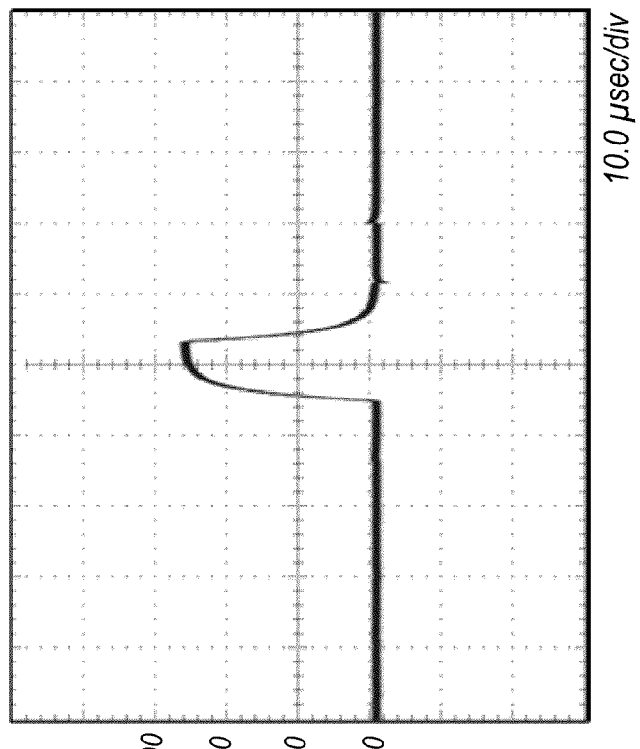
FIG. 20B is a timing diagram illustrating hardware signal response of one embodiment of a novel resistive touch panel of the first type to an excitation pulse at row 36, column 47.
Figure 20A:
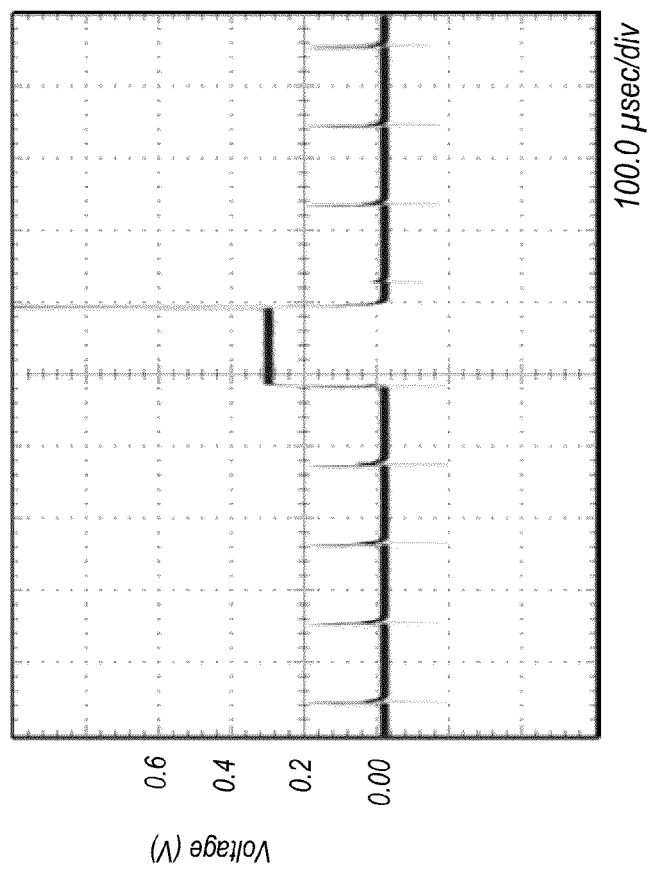
FIG. 20A is a timing diagram illustrating hardware signal response of a standard resistive touch panel of the first type to an excitation pulse at row 36, column 47.
Figure 21B:
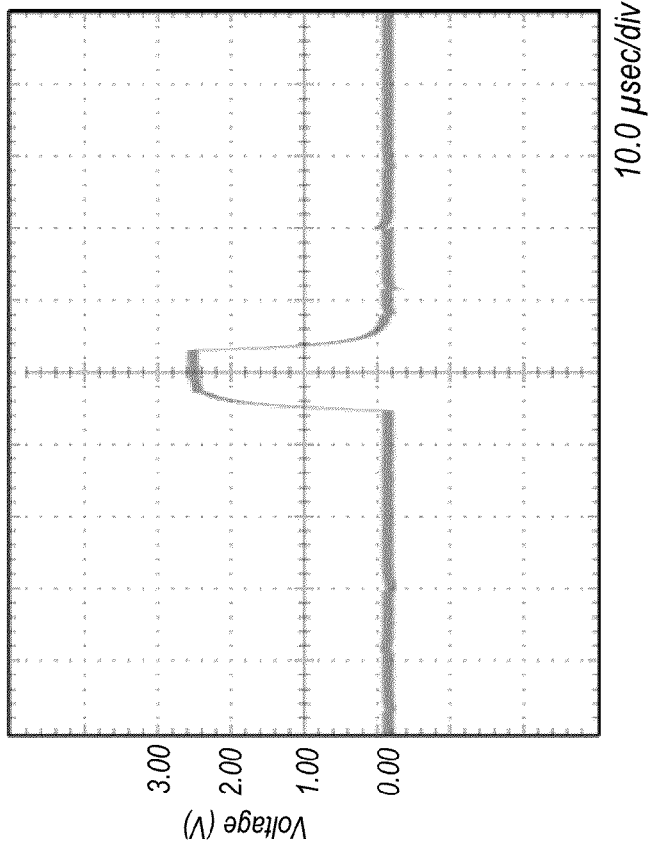
FIG. 21B is a timing diagram illustrating hardware signal response of one embodiment of a novel resistive touch panel of the first type to an excitation pulse at row 2, column 47.
Figure 21A:
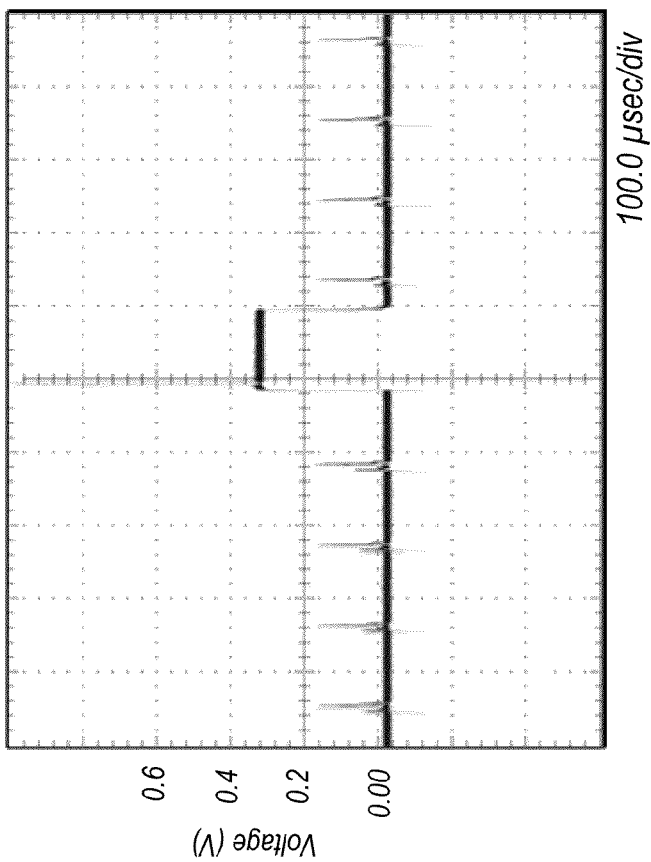
FIG. 21A is a timing diagram illustrating hardware signal response of a standard resistive touch panel of the first type to an excitation pulse at row 2, column 47.
Figure 22B:
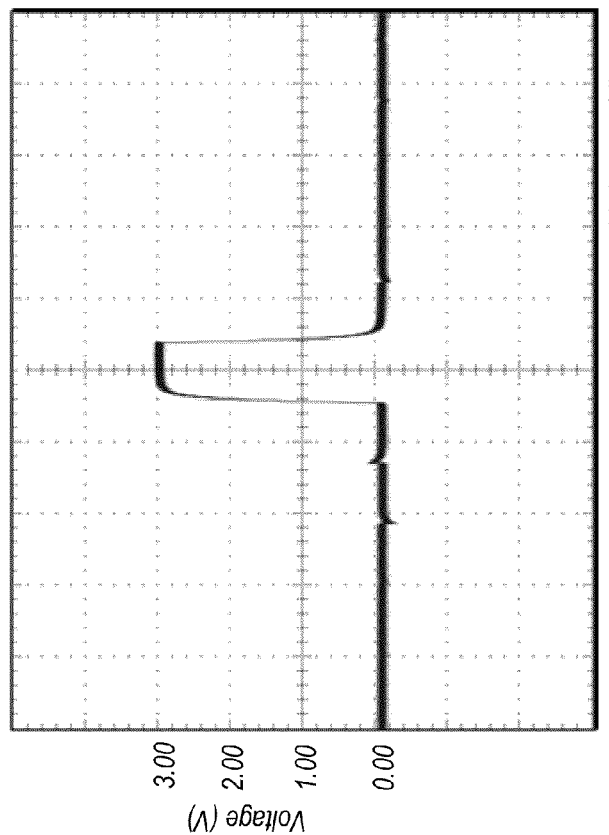
FIG. 22B is a timing diagram illustrating hardware signal response of one embodiment of a novel resistive touch panel of the first type to an excitation pulse at row 35, column 2.
Figure 22A:
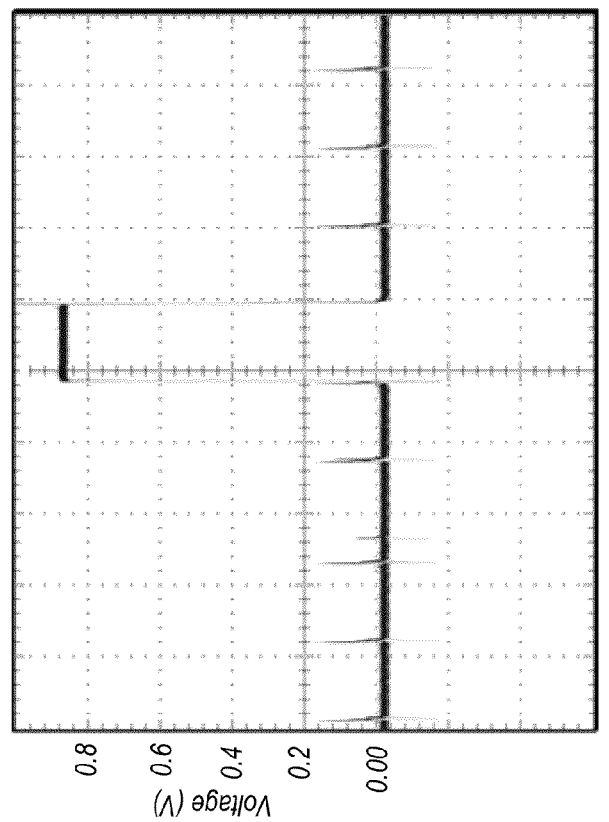
FIG. 22A is a timing diagram illustrating hardware signal response of a standard resistive touch panel of the first type to an excitation pulse at row 35, column 2.

A very small stylus (0.5 mm mechanical pencil tip) may be used to get a maximum signal in all circumstances. FIGS. 19A/B through 26A/B show the observed voltage waveforms for comparative signals on the same TP using the same breakout board. Specifically, FIGS. 19A/B through 22A/B show the results for testing performed on device ID #SN375, while FIGS. 23A/B through 26A/B show the results for testing performed on device ID #SN349. As seen in the aforementioned figures, and as further described below, there is a noticeable difference in both voltage and time scales. In prior art devices the column is excited for over 100 µs, while in a preferred embodiment the column is excited for just over 8 µs. The voltage scale for a prior art silicon trace is 500 mV/div, while the voltage scale for the preferred embodiment is 1V/div, showing more than a 2× improvement in response. Also of note is the similarity in the non-touched response on the rest of the trace. While the prior art device exhibits high impedance (Hi-Z) on the undriven tracks, in the preferred embodiment the impedance is 100 kΩ on all rows and columns during normal scan.

Examining these signals, the amplitude in the prior art silicon solution is apparent. The noise at this point is equal in amplitude to the signal, but has higher frequency content. Additionally, the useable signal has fallen from 1.4V to 320 mV, or by a factor of almost 5. The signal at the far point in the preferred embodiment has been attenuated to 2.75V, or by about 12%. The remaining two corners are shown in FIGS. 7 and 8 for completeness.

Figure 23B:
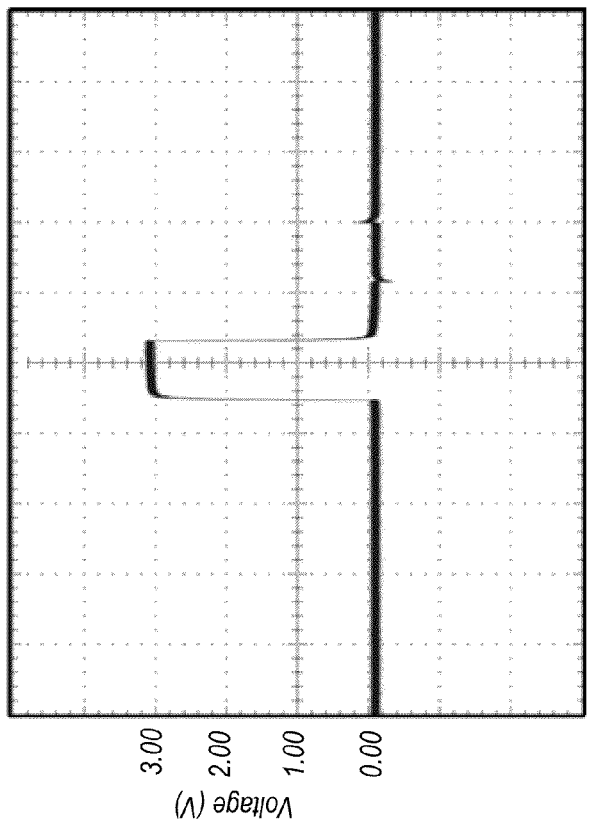
FIG. 23B is a timing diagram illustrating hardware signal response of one embodiment of a novel resistive touch panel of the second type to an excitation pulse at row 35, column 47.
Figure 23A:
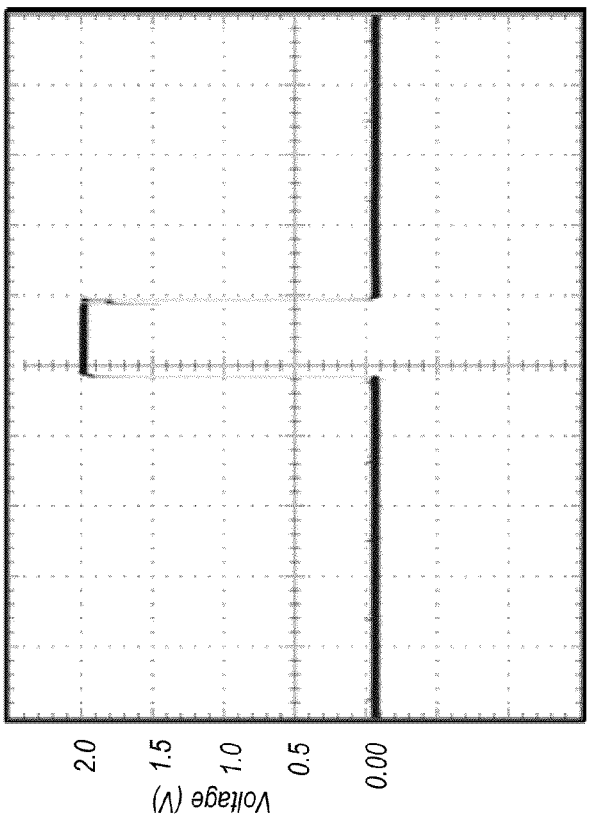
FIG. 23A is a timing diagram illustrating hardware signal response of a standard resistive touch panel of a second type to an excitation pulse at row 35, column 47.
Figure 24B:
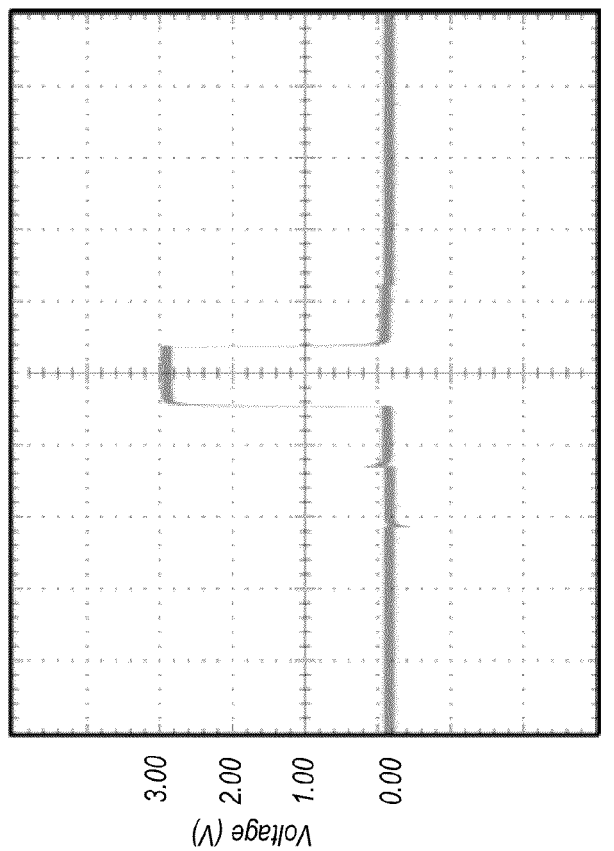
FIG. 24B is a timing diagram illustrating hardware signal response of one embodiment of a novel resistive touch panel of the second type to an excitation pulse at row 2, column 2.
Figure 24A:
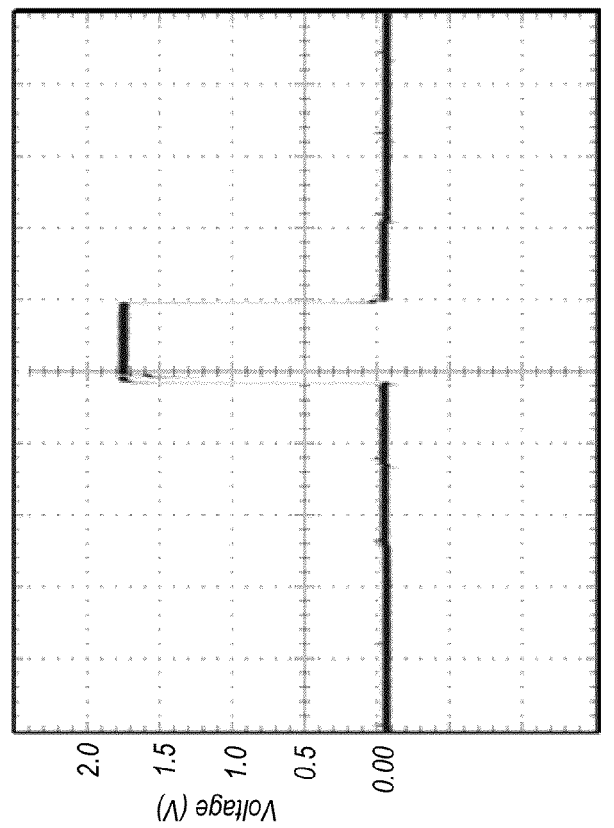
FIG. 24A is a timing diagram illustrating hardware signal response of a standard resistive touch panel of the second type to an excitation pulse at row 2, column 2.
Figure 25B:
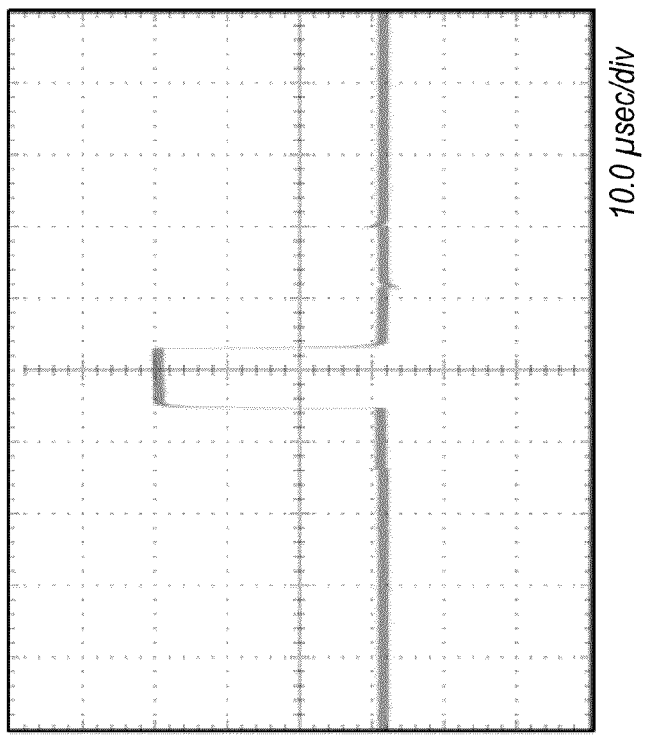
FIG. 25B is a timing diagram illustrating hardware signal response of one embodiment of a novel resistive touch panel of the second type to an excitation pulse at row 2, column 47.
Figure 25A:
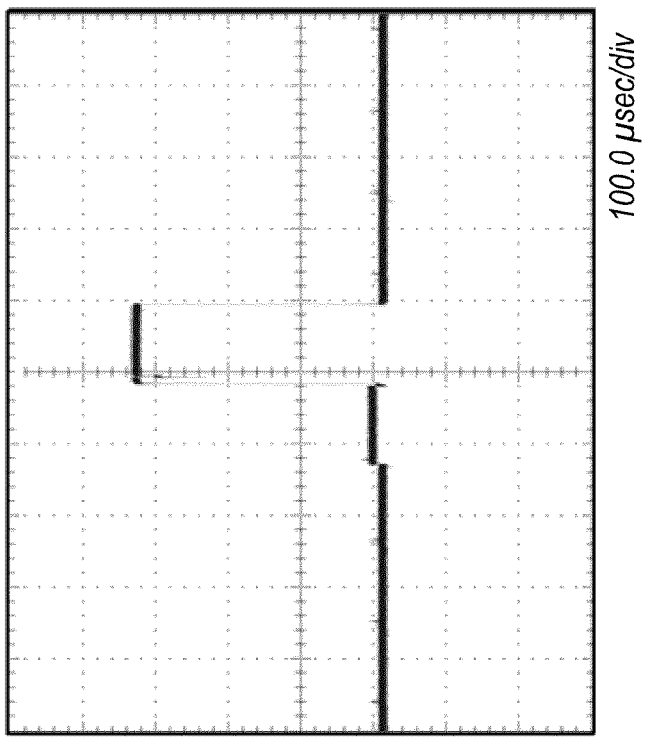
FIG. 25A is a timing diagram illustrating hardware signal response of a standard resistive touch panel of the second type to an excitation pulse at row 2, column 47.
Figure 26B:
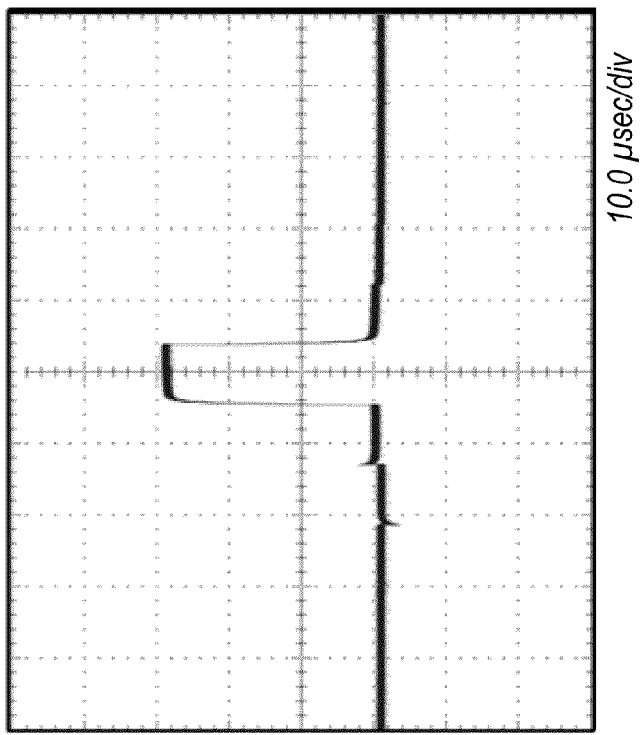
FIG. 26B is a timing diagram illustrating hardware signal response of one embodiment of a novel resistive touch panel of the second type to an excitation pulse at row 12, column 2.
Figure 26A:
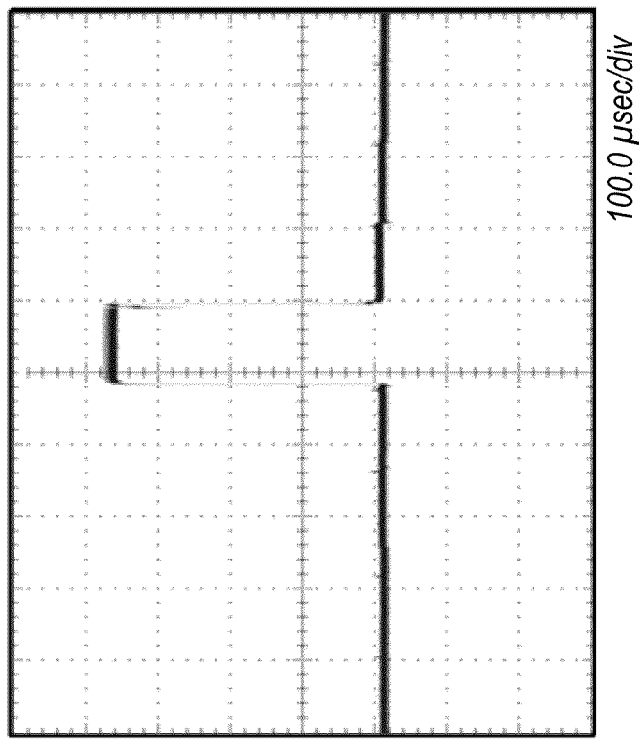
FIG. 26A is a timing diagram illustrating hardware signal response of a standard resistive touch panel of the second type to an excitation pulse at row 12, column 2.

The other technology potentially affecting termination is the silver/resistive technologies. These represent very low impedance tracks, with an induced resistance at the touch site generated by a third material situated between the standard films. The sample of this panel, device ID #SN349, is an opaque version. For this testing, an attempt to normalize the signal at the high side is made in order to standardize the response from the panel. For the prior art silicon solution the signal level is higher, at 2.0V, as shown in the graphs in FIGS. 23A, 24A, 25A, and 26A. However, there is no impact to the preferred embodiment, as seen in the graphs in FIGS. 23B, 24B, 25B, and 26B. FIGS. 23A/B through 26A/B show the graphs corresponding to the remaining corners for completeness.

Figure 27:
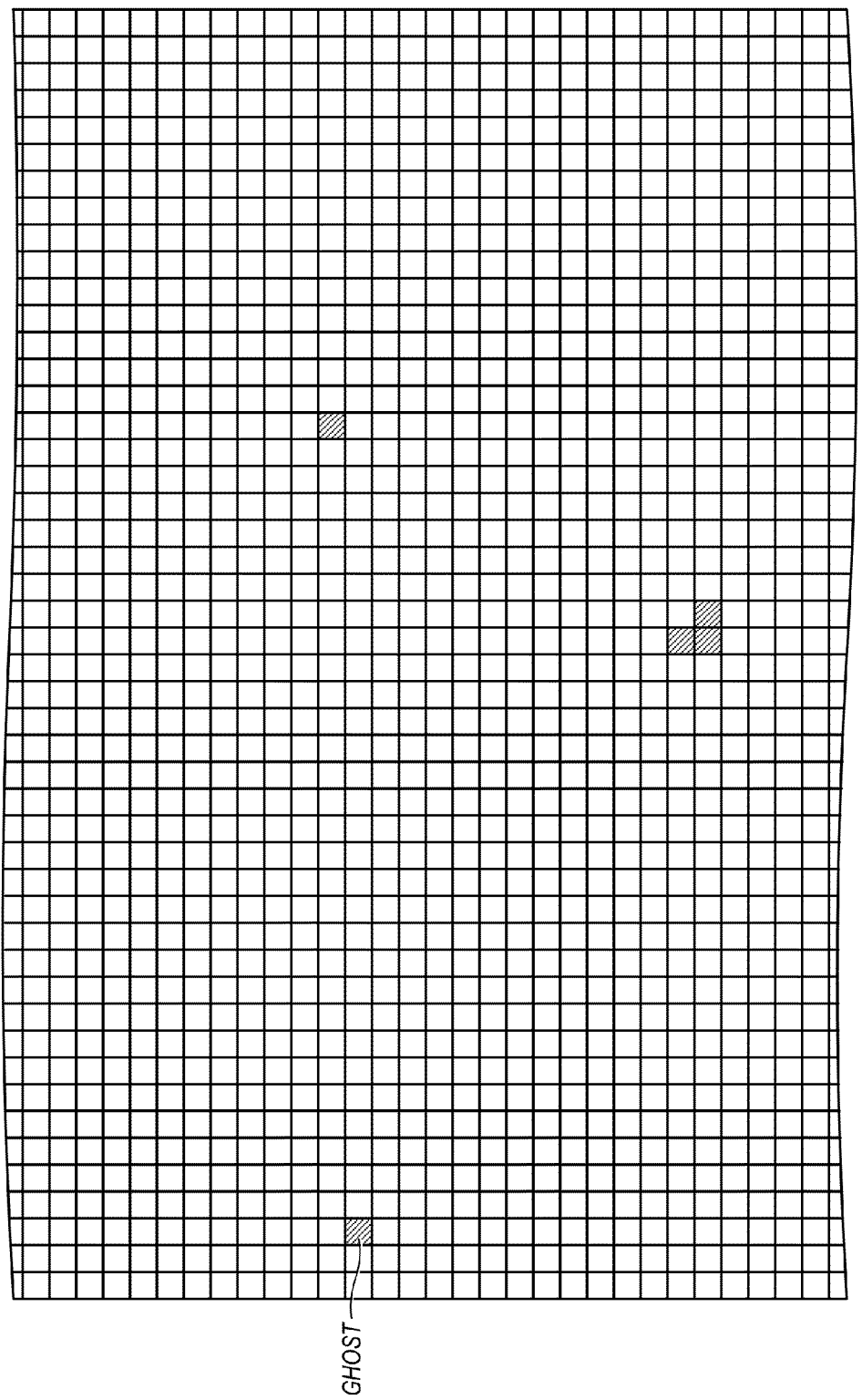
FIG. 27 shows a snapshot from a Windows Media Player file demonstrating use of preferred termination schemes in a dynamic touch environment.

The performance of the prior art silicon solution is well known and documented. In order to determine if embodiments featuring the termination scheme disclosed herein are applicable in a broader sense, a "digital" touch panel may be constructed in the FPGA by sampling the inputs, and setting a bit representing a touch when the signal passes a specified threshold value. A digital level translator is used, running at 2V (~1.4V="1") rail for the Silver/Resistive panel, and 1.3V (~1.0V="1") on the Classic ITO panel to shift the digital touch from the lower rail voltage to a 3.3V rail voltage. The translation is performed because the termination represents a voltage divider between the TP track and the digital input of the FPGA. Additionally, the value of all 100 kΩ resistors may be varied ±30%, from 70 kΩ to 130 kΩ, placed randomly for termination. A snapshot from a Windows Media Player file is shown in FIG. 27. From the snapshot, it is possible to discern that the raw digital approach has limitations. Since a threshold level is the only touch criteria, ghosting is not only possible but highly likely. The analysis provided above demonstrates the efficacy of using embodiments of the termination scheme disclosed herein in a dynamic touch environment. It also demonstrates to the first order that change in the termination has no deleterious effects on noise at the row receiver output to the IC.

Therefore, various embodiments of the termination scheme disclosed herein allows leveling the signals across the TP without the use of either a "slew rate limited" column driver or a "variable threshold" comparator for the row receivers. Furthermore, the new termination scheme is insensitive to termination tolerance. That is, in various embodiments, an N-FET with very loose tolerance may be coupled to ground to provide the necessary termination. Further investigation may determine if there is a substantial advantage in removing the termination on the row being scanned. This may further normalize all signals on the TP.

Yet another benefit that may be fully evaluated is the ability to sample multiple channels in parallel. Since the impedance is always attached to the I/O pin, terminating multiple signals over a given sample period may become a moot point. The terminations are always in place, and the ability to sample multiple channels serially or in parallel is a matter of architecture and convenience, not a necessity for any given technology. This may greatly simplify the implementation, since different technologies do not require different termination and sampling schemes.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A sensing apparatus comprising:
    a resistive touch panel comprising and active sense matrix of rows and columns configured to provide sense signals responsive to a touch to the resistive touch panel; and
    a controller configured to:
        receive the sense signals by sampling one or more rows of the rows; and
        for each sampled row:
            changing a termination of the sampled row by coupling an end of the sampled row from a lower value resistor to a higher value resistor; and
            pulling to a voltage rail respective resistors coupled to respective ends of non-sampled rows adjacent to the sampled row while the sampled row is being sampled.

* * * * *